United States Patent [19]

LeBlanc

[11] Patent Number: 5,596,625
[45] Date of Patent: *Jan. 21, 1997

[54] METHOD FOR ROUTING EMERGENCY CALLS DURING BUSY INTERFACE CHANNEL CONDITIONS

[75] Inventor: Frederick W. LeBlanc, Arvada, Colo.

[73] Assignee: U S West Technologies, Inc., Boulder, Colo.

[*] Notice: The term of this patent shall not extend beyond the expiration date of Pat. No. 5,508,707.

[21] Appl. No.: 314,180

[22] Filed: Sep. 28, 1994

[51] Int. Cl.$^6$ .................................................. H04Q 7/20
[52] U.S. Cl. ............................... 379/60; 379/58; 379/45; 455/33.2
[58] Field of Search ........................ 379/37, 45, 58, 379/59, 60, 62; 455/33.1, 54.1, 33.2, 54.2, 56.1, 62, 63; 342/457; 395/909, 917; 364/514, 516, 517

[56] References Cited

U.S. PATENT DOCUMENTS

| | | |
|---|---|---|
| 3,889,264 | 6/1975 | Fletcher . |
| 4,054,880 | 10/1977 | Dalabakis et al. . |
| 4,550,443 | 10/1985 | Freeburg ............................ 455/62 X |
| 4,670,899 | 6/1987 | Brody et al. ............................ 379/60 |
| 4,736,453 | 4/1988 | Schloemer ........................ 455/56.1 X |
| 4,799,062 | 1/1989 | Sanderford, Jr. et al. . |
| 4,833,480 | 5/1989 | Palmer et al. . |
| 4,839,892 | 6/1989 | Sasaki ................................ 379/45 X |
| 4,876,738 | 10/1989 | Selby . |
| 4,888,595 | 12/1989 | Friedman . |
| 4,891,650 | 1/1990 | Sheffer . |
| 5,043,736 | 8/1991 | Darnell et al. . |
| 5,055,851 | 10/1991 | Sheffer . |
| 5,097,499 | 3/1992 | Cosentino . |
| 5,103,459 | 4/1992 | Gilhousen et al. . |
| 5,173,710 | 12/1992 | Kelley et al. . |
| 5,175,867 | 12/1992 | Wejke et al. ........................... 455/33.1 |
| 5,179,721 | 1/1993 | Comroe et al. . |
| 5,208,756 | 5/1993 | Song . |
| 5,216,429 | 6/1993 | Nakagawa et al. . |
| 5,218,367 | 6/1993 | Sheffer et al. . |
| 5,218,629 | 6/1993 | Dumond, Jr. et al. . |
| 5,221,925 | 6/1993 | Cross . |
| 5,223,844 | 6/1993 | Mansell et al. . |
| 5,280,295 | 1/1994 | Kelley et al. . |
| 5,347,568 | 9/1994 | Moody et al. ............................ 379/45 |
| 5,388,147 | 2/1995 | Grimes ................................... 379/59 |
| 5,422,933 | 6/1995 | Barnett et al. ........................... 379/60 |
| 5,454,026 | 9/1995 | Tanaka .................................. 379/60 |
| 5,508,707 | 4/1996 | LeBlanc et al. .......................... 379/59 |

Primary Examiner—Curtis Kuntz
Assistant Examiner—William G. Trost
Attorney, Agent, or Firm—Brooks & Kushman, P.C.

[57] ABSTRACT

A method for routing enhanced 9-1-1 (E9-1-1) calls from a mobile emergency user to a Public Safety Answering Point (PSAP). The method is directed specifically for use in a wireless communication system which includes a plurality of base stations each of which is operative to communicate with corresponding mobile units within its coverage area over air interface channels. When all interface channels of the corresponding base stations of the mobile emergency user are busy, the location of the emergency mobile user will determined in cooperation with a Location Adjunct Processor (LAP). All other mobile units communicating with the corresponding base stations will be identified. Predetermined uplink and downlink RF measurements for each of these mobile units will thereafter be extracted and by reference to the same it may be determined which of the mobile units are also within the coverage areas of neighboring base stations. It may further be determined which of the neighboring base stations can support additional mobile units. Once provided with this information, automatic link transfers/handoffs/handovers will be initiated so as to open an interface channel with a currently blocked E9-1-1 call.

3 Claims, 16 Drawing Sheets

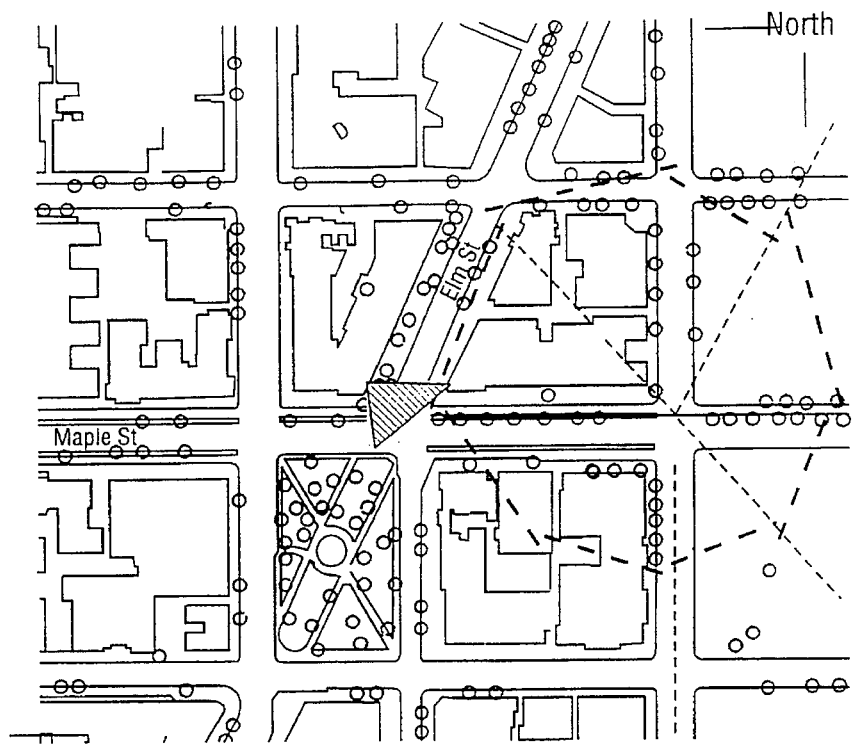
Fig. 20
Fig. 21
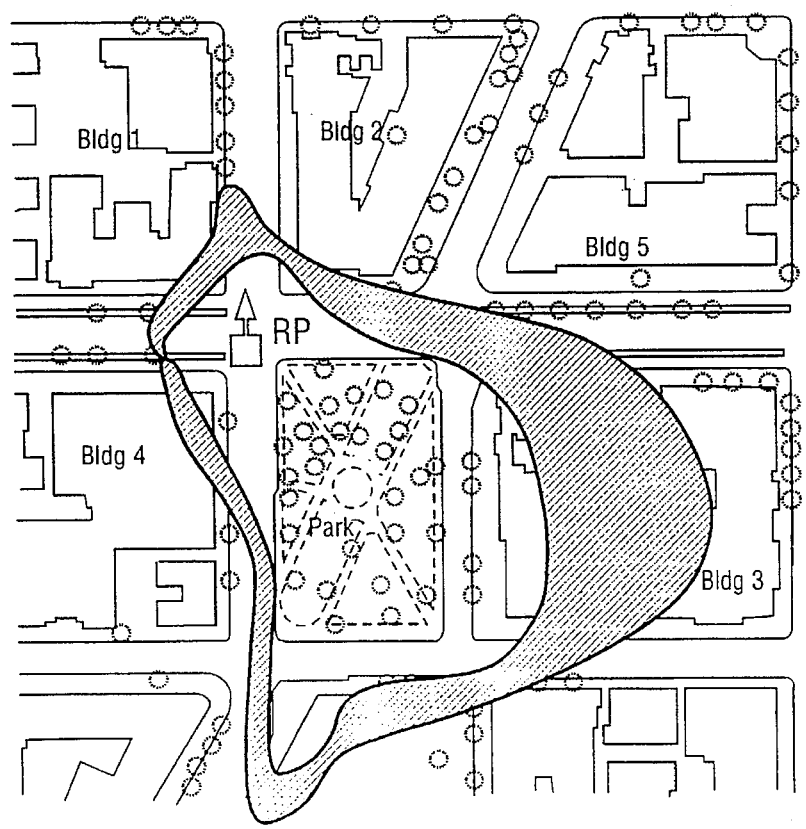

METHOD FOR ROUTING EMERGENCY CALLS DURING BUSY INTERFACE CHANNEL CONDITIONS

TECHNICAL FIELD

The present invention relates generally to wireless communication systems and, more particularly, to a method for routing emergency calls and handling emergency call access requests from originating mobile units where all interface channels of their corresponding base stations are busy. The invention is particularly suited for use in routing Enhanced 9-1-1 (E9-1-1) calls to Public Safety Answering Points (PSAPs).

BACKGROUND ART

A fundamental approach toward caller location in wireless communication networks is to be able to determine that an emergency service call has originated, to provide the location of the base station that the caller is currently using, and to provide handset/mobile unit ID of the caller.

Though not provided in conventional systems, this information is nonetheless available in certain PCS architectures such as, for example, PACS, formerly called WACS (Bellcore), DECT (European), CDMA (Omniopoint), PHS-PHP (Japan), IS-54 (TDMA), IS-95 (CDMA), PCS-1900 (GSM), and B-CDMA (Oki), and features which may be implemented as private networks or regulated services. PACS architecture provides the capability via a layer 2 protocol for the 911 user's mobile unit to indicate that an emergency call is being attempted, but for which no base station/control unit resources are available. This special signaling is accomplished by allowing the mobile unit to borrow spare "filler bits" which are sent during quiet portions of the air interface signals, in order to squeeze in the emergency request information. Similar means exist in related PCS architecture to provide a lightweight emergency access signal to a processing entity that can further initiate a 911 call and possibly perform location functions.

The prior art thus makes it possible for a mobile unit to indicate to a control unit that an emergency call is being requested, even though no voice time slots (voice communications channels) are available. This approach, while better than sending no information at all, is less than optimal because it fails to provide precise location information since only the location of the originating base station is transmitted. Moreover, the prior art provides no means, other than the use of filler bits, to transmit an emergency call when corresponding base station/control unit resources are busy.

Consequently, a need has developed for a method which will permit more precise position determination and which provides a means for propagating emergency access requests as well as a method for reallocating existing communications in an attempt to free up a voice channel for the transmission of an emergency call.

DISCLOSURE OF THE INVENTION

It is a general object of the present invention to overcome the limitations of the prior art by providing an improved method for routing emergency calls in a wireless communication system where all interface channels of the corresponding base stations are busy.

Yet another object of the present invention is the provision of an improved method of routing emergency calls from originating mobile units in a wireless communication system to a Public Safety Answering Point (PSAP) along with precise location information where all interface channels of the corresponding base stations are busy.

Still further, it is an object of the present invention to provide an improved method for routing emergency calls and precise mobile unit location information during busy interface channel conditions by initiating one or more Automatic Link Transfers (ALTs)/handoffs/handovers of mobile units in an attempt to open an interface channel for transmission of the emergency call.

In carrying out these and other objects, features and advantages of the present invention, a method is provided for routing Enhanced 9-1-1 (E9-1-1) calls from a mobile emergency user to a Public Safety Answering Point (PSAP). The method is directed specifically for use in a wireless communication system including a plurality of base stations each operative to communicate with corresponding mobile units within its coverage area over air interface channels. Still further, the method is directed for use during situations where all interface channels of the corresponding base stations of the mobile emergency user are busy.

In accordance with the invention, the location of the emergency mobile user is determined in cooperation with a Location Adjunct Processor (LAP). All other mobile units, i.e., those other than the mobile unit which originated the emergency call request and which are communicating with the corresponding base stations of the emergency mobile user are identified. Predetermined uplink and downlink RF measurements for each of these mobile units is thus extracted. By reference to these RF measurements, it may be determined which of the mobile units are also within the coverage areas of neighboring base stations. It may further be determined which of the neighboring base stations can support additional mobile units. Once provided with this information, the feasibility of Automatic Link Transfers (ALT)/handoffs/handovers of one or more of the mobile units at one or more of the neighboring base stations is determined with the goal of opening an interface channel for the currently blocked E9-1-1 call.

If one or more ALTs/handoffs/handovers could not be performed, thus precluding the opening of an interface channel, a non-voice path Emergency Access Call (EAC) may be generated for receipt by the PSAP including the determined location of the emergency mobile user. If one or more ALTs/handoffs/handovers will open an interface channel, the ALT/handoff/handover is initiated so as to allow the mobile emergency user to have access to the open channel for a provisioned period of time necessary to forward the E9-1-1 call to the PSAP along with the determined location of the originating mobile unit.

BRIEF DESCRIPTION OF THE DRAWINGS

The foregoing aspects and many of the attendant advantages of this invention will become more readily appreciated as the same becomes better understood by reference to the following best modes for carrying out the invention, when taken in conjunction with the accompanying drawings wherein:

FIG. 20 is a schematic diagram of the bounding polygon of FIG. 19 as projected on an orthophotograph which may be stored digitally; and FIG. 21 is a schematic diagram of a sample bounding polygon defined by a single base station;

BEST MODES FOR CARRYING OUT THE INVENTION

Figure 1:
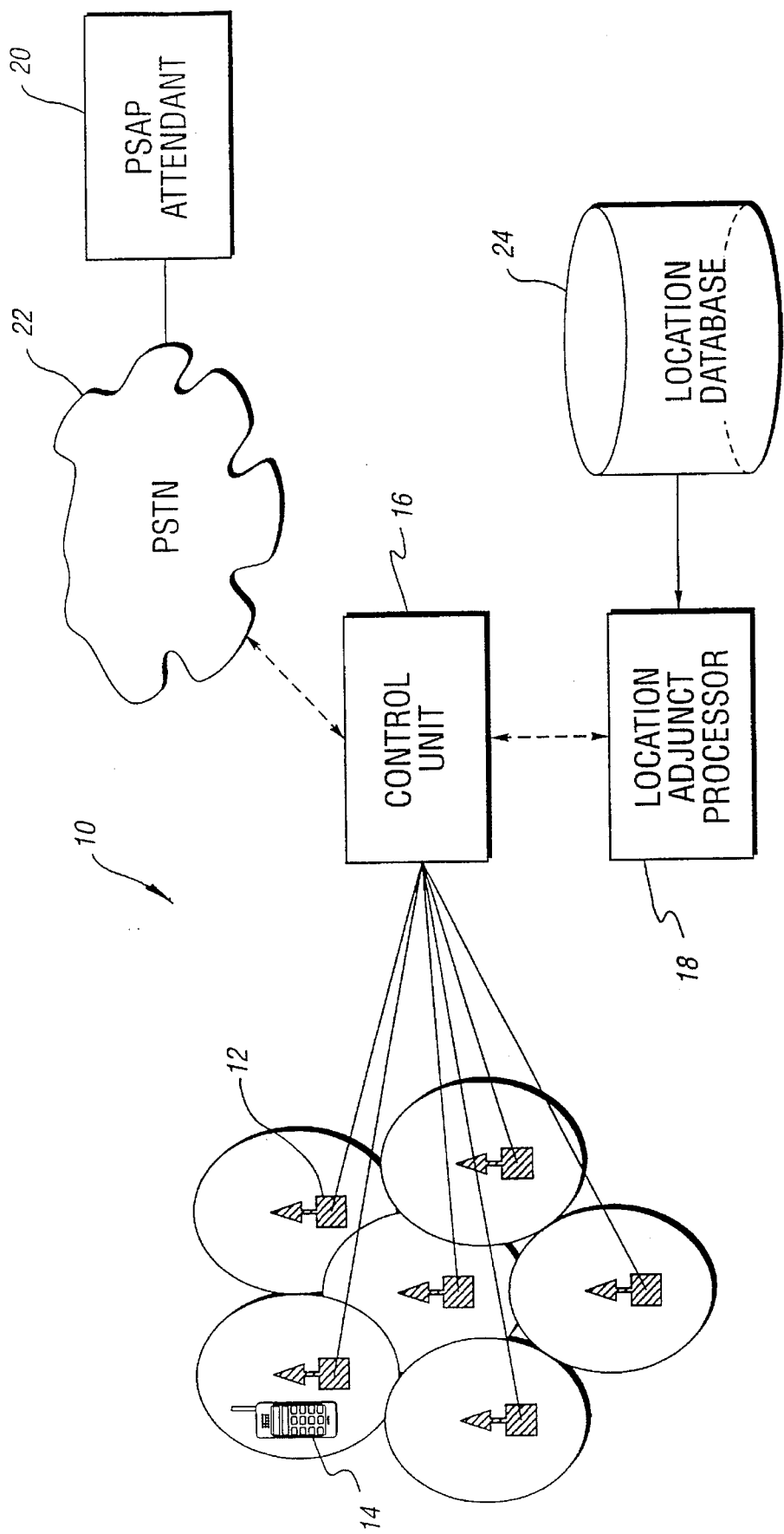
FIG. 1 is a schematic diagram of a wireless communication system directed for use with the present invention.

The method of the present invention is particularly directed for use in a wireless communication system such as that shown in FIG. 1 and designated by reference numeral 10. System 10 includes a plurality of base stations such as Radio Ports (RPs) 12. Each of the base stations 12 are operative to communicate with corresponding mobile units 14 within coverage areas 16 over air interface channels known to those skilled in the art. Each of the base stations/ RPs 10 are provided in electrical communication with a corresponding control unit 16 which, in turn, is provided in electrical communication with a Location Adjunct Processor (LAP) 18 and a PSAP attendant station 20 through the Public Switched Telephone Network (PSTN) 22. Control unit 16 may be a Mobile Telephone Switching Center (MTSC) when used in a cellular telephone network or a Distributed Radio Port Controller (DRPC) when used in a PCS system or the like.

A location databank 24 is also provided which is operative to store real-time RF measurements for base stations 12, including their link budgets i.e., the calculation of transmission losses and noise associated with the wireless communication link between the radio ports 12 and mobile unit 14. LAP 18 may similarly be any suitable Intelligent Peripheral (IP) which is operative to access the location databank 24 and determine and forward the location of the handset/ mobile unit 14 to the control unit 16.

As indicated above, it is known to those skilled in the art that in WACS (PACS) architecture, it is possible to indicate through the use of layer 2 protocol that an emergency call is being attempted, but for which no base station/control unit resources are available. This special signaling is accomplished by allowing the mobile unit to borrow spare "filler bits" which are sent during quiet portions of the air interface signals, in order to squeeze in the emergency request information. Thus, while it is possible for a WACS (PACS) mobile unit to indicate to the control unit that an emergency call is being requested, even though no time slots (voice communications channels) are available, it is not possible to do so with precise location information. Nor is it possible to open up a voice channel once an original congestion, i.e., busy signal, has been obtained.

In accordance with the present invention, the location of the originating mobile unit is first determined in cooperation with Location Adjunct Processor 18 and a suitable position determining system and method as explained in further detail below.

As shown, the positioning system 10 is directed for use with the Public Switched Telephone Network (PSTN) 22 which is provided in electrical communication with the control unit 16. Control unit 16 is therefore operative to receive calls forwarded by base stations 10, temporarily suspended call processing, and generate call information request signals. The LAP 18 receives the call information request signals, accesses location database 24 and determines and forwards the location of the mobile unit to the control unit 18. The call is thereafter forwarded to the PSTN 22 along with the determined mobile unit location.

Figure 2:
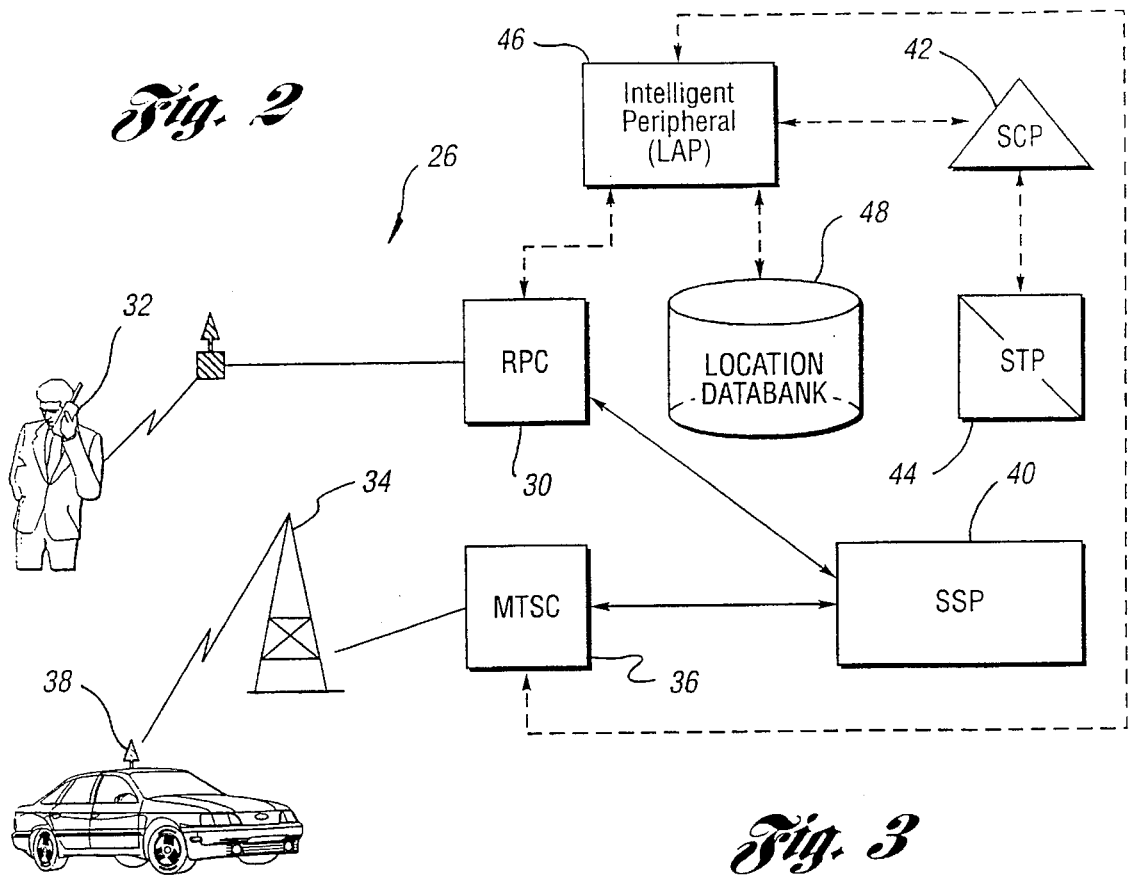
FIG. 2 is a schematic diagram of an alternative wireless communication system directed for use with the present invention.

An alternative communication system is shown in FIG. 2 of the drawings and designated generally by reference numeral 26. System 26 is a modified Advanced Intelligent Network (AIN) and is operative to handle both cellular and PCS calls. System 26 includes at least one base station 28 such as a Radio Port (RP) which is provided in electrical communication with a control unit 30 such as a Radio Port Controller (RPC) for receiving PCS calls from a PCS subscriber having a handset/mobile unit 32. Similarly, a traditional power base station 34 including a cellular tower is provided in electrical communication with MTSC 36 for receiving cellular calls from cellular subscriber 38. Both RPC 30 and MTSC 36 are provided in electrical communication with Service Switching Point (SSP) 40 which in turn is provided in electrical communication with Service Control Point (SCP) 42 through Service Transfer Point (STP) 44. RPC 30 and SCP 42 are further provided in electrical communication with a Location Adjunct Processor (LAP) such as Intelligent Peripheral (IP) 46.

As those skilled in the art will recognize, Service Switching Points 40 are generally nodes (usually the subscriber's local switch/central office switch) that recognize the "triggers" used when a subscriber invokes an Intelligent Network Service and then communicates with the SCP 42 to operate the service. Service Control Point 42 is similarly a node which contains the service logic and associated data support to execute the required customer services. Finally, Service Transfer Point 44 is a packet switch used to route signaling messages within the Advanced Intelligent Network. These packet switching elements are known to those having ordinary skill in the art and will, therefore, not be discussed in further detail.

SCP 42 is operative to invoke a Service Logic Program (SLP). SSP 40 is further operative to temporarily suspend call processing and send a call information request signal to SCP 42 via STP 44 so as to invoke the SLP. A location databank 48 which is provided in electrical communication with Intelligent Peripheral 46 is operative to store real-time RF·measurements for Radio Port 28 and/or cellular base station tower 34, including their link budgets i.e., the calculation of transmission losses and noise associated with the wireless communication link between the radio port 28 and mobile unit 32. Intelligent Peripheral 46 is further operative to access the location database 48 and determine and forward the location of PCS subscriber 32 or cellular subscriber 38 to their respective control units, i.e., DRPC 30 and MTSC 36, at the request of the SLP.

Figure 3:
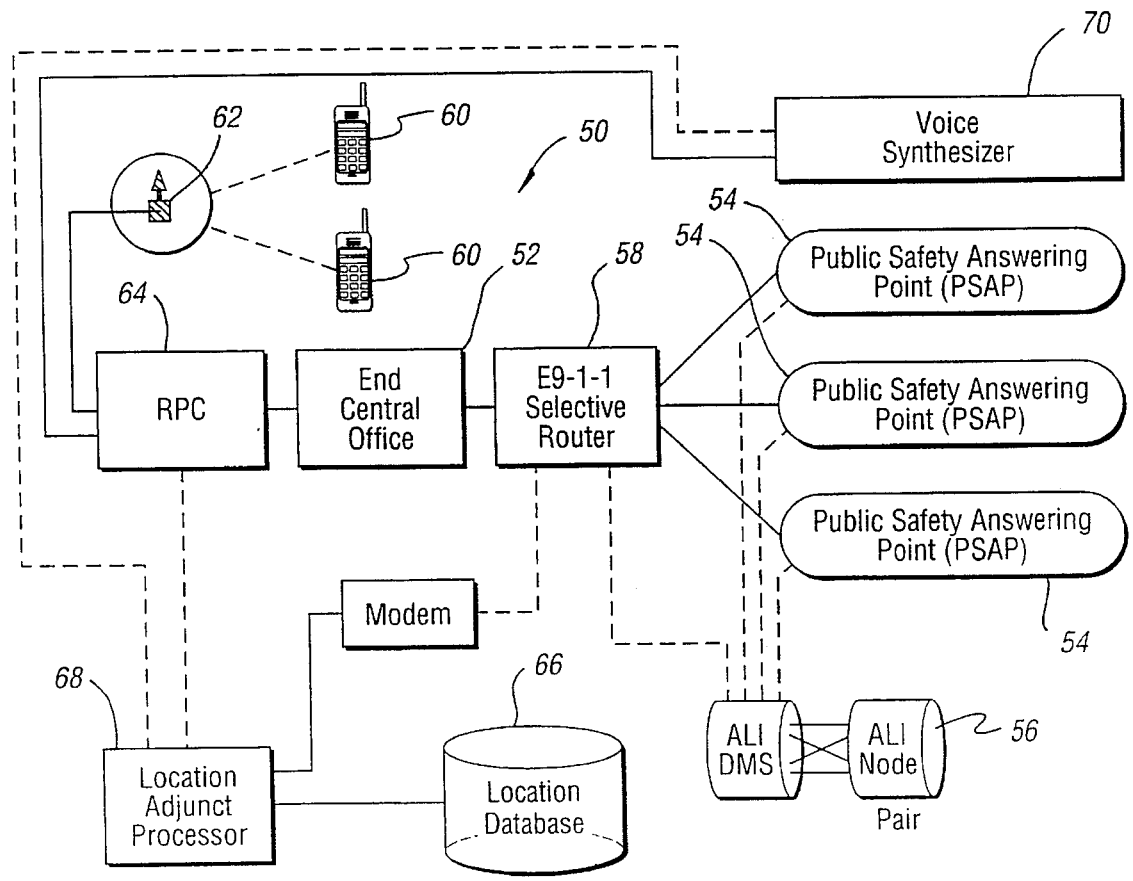
FIG. 3 is a schematic diagram of yet another wireless communication system directed for use with the present invention.

Referring now to FIG. 3 of the drawings, yet another wireless communication system is shown which is directed for use with the present invention. The location transport system is and designated generally by reference numeral 50 and is adapted for use in the Public Switched Telephone Network (PSTN). System 50 includes at least one end central office 52 which is provided in electrical communication with a plurality of Public Safety Answering Points (PSAPs) 54 and an Automatic Location Identification/Data Management system (ALI/DM) database 56 via an Enhanced 9-1-1 (E9-1-1) selective router 58. The location transport system 50 is operative to route E9-1-1 calls from mobile units 60 and, like the above systems, includes a plurality of base stations such as Radio Ports 62. Each of the base stations 62 is assigned a pseudo directory number which is uniquely associated with it. This number is stored in the ALI/DM database 56 along with its location. Each of the base stations 62 is operative to receive calls originating from one or more of the mobile units 60 over air interface channels.

The system similarly includes a control unit 64 which as referenced above may be an MTSC when used in a cellular telephone network or a RPC when used in a PCS system as shown. Control unit 64 is operative to receive calls forwarded by base stations 62, temporarily suspend call processing, and generate a call information request signal. A location database 66 is also provided which is operative to store real-time RF measurements for each of the base stations 60, including its link budget i.e., the calculation of transmission losses and noise associated with the wireless communication link between the radio port 62 and mobile unit 60. Finally, a LAP 68 is provided in electrical communication with location database 66 and control unit 64.

As in the previous systems, the LAP 68 is operative to receive a call information request signal, access the location database 66 and determine and forward the location of a mobile unit 60 to the control unit 64. Unlike the above systems, however, in this system, the call will thereafter be forwarded to one of the PSAPs 54 in accordance with the pseudo directory number of the corresponding base station along with its determined location and the location of the mobile unit that originated the call.

Significantly, the above location information, i.e. the determined location of the mobile unit and the location of the corresponding base station may be forwarded to the PSAP 54 as a text description, video description, data point description or any other suitable informative means. A voice synthesizer 70 may also be provided in electrical communication with PSAPs 54 which is operative to audibly announce the location of the mobile unit that originated the call. In operation, voice synthesizer 70 will announce location to a PSAPs 54. In addition, the call will be routed to the correct PSAP (i.e., the nearest PSAP to the base station) and the base station's location will be displayed on the PSAP terminal, thus requiring no new equipment or functionality.

As those skilled in the art will recognize, wireline 9-1-1 calls are routed to the correct PSAP 54 via a Telephone Number/Emergency Service Zone TN/ESZ translation in the E9-1-1 selective router 58. Each directory number (or terminal number) is associated with an emergency service number, which in turn is associated with a trunk group terminating to the correct PSAP. The location of the directory number is determined by the E9-1-1 selective router 58 via a database look up in the ALI/DMS (Automotive Location Identification/Data Management System) database. The ALI/DMS stores the location of each directory number, allowing the E9-1-1 selective router to forward this location to the PSAP.

Because wireless handsets, i.e. mobile units 60, do not contain an entry in the TN/ESN translation or the ALI/DMS system, wireless calls must be switched through the end central office 52 using a pseudo directory number uniquely associated with the base station 62. Each of these pseudo directory numbers is stored in both the TN/ESN and the ALI/DMS systems. This will allow for the base station's location to be displayed at the PSAP 54, while the location of the mobile unit 60 and callback number is announced using the voice synthesizer 70.

In the above voice synthesis approach, after PSAP answer supervision, but before PCS caller receipt of PSAP answer supervision, an in-band voice synthesizer device 70 provides the location information. The device temporarily bridges on to the forward channel, announcing location to the PSAP attendant, while the PCS caller 60 hears ringing tones. A location announcement typically would take between 5–8 seconds. This voice synthesis alternative would require a new PCS call-control function. After receipt of the PSAP answer supervision signal at the location calculation point, this signal would be temporarily stored in abeyance while the voice synthesizer 70 outputs the location information to the PSAP 84.

Figure 4:
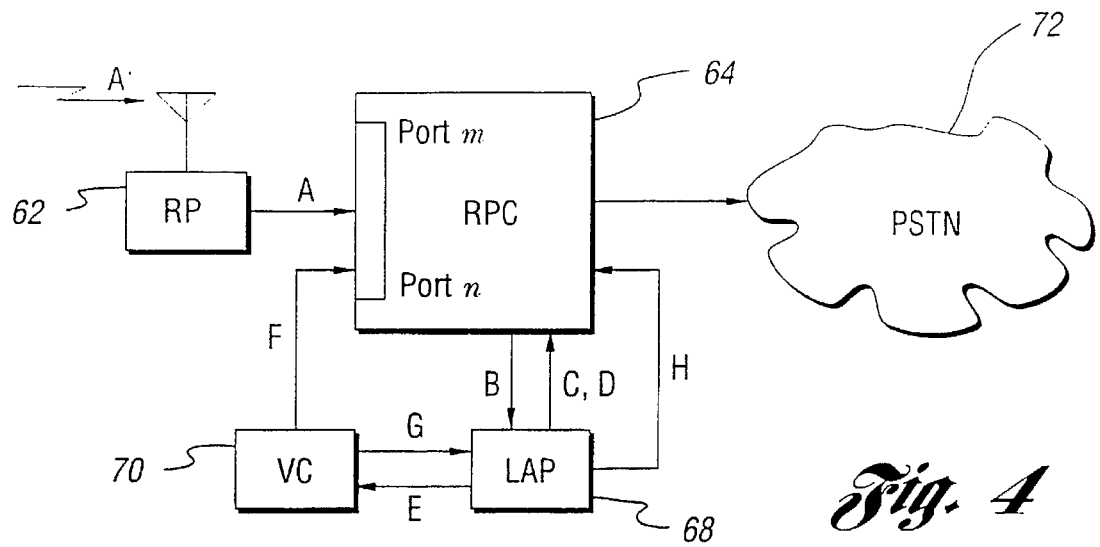
FIG. 4 is a schematic diagram of the process flow of an incoming E9-1-1/location call request in accordance with the wireless communication system of FIG. 3.

A high-level voice synthesis implementation is shown, for example, in FIG. 4 of the drawings. As shown by the process flow, an in-coming E9-1-1/location call request (A) is received by Radio Port 62 and forwarded to RPC 64. Thereafter, a trigger signal (B) is generated in the RPC 64 to inform the LAP 68. The RPC 64 suspends the call. LAP 68 thereafter performs the location estimate and generates a signal (C) instructing the RPC 64 to continue the call request onward to the PSTN 72 and PSAP 54.

Still referring to FIG. 4, the LAP 68 thereafter generates a request signal (D) seeking a conference bridge between the incoming port (m) and the Voice Circuit (VC) 70 port end. LAP 68 further directs VC 70 to generate an announcement signal (E) announcing the location information (e.g., latitude and longitude). Next, VC 70 plays the synthesized latitude and longitude (F) for receipt by RPCU 64. VC 70 further provides LAP 68 with a completion notification (G). Finally, LAP 68 generates a signal (H) instructing RPCU 64 to connect the end user with the PSAP 54 or PSTN user.

The PLS Interface

Figure 5:
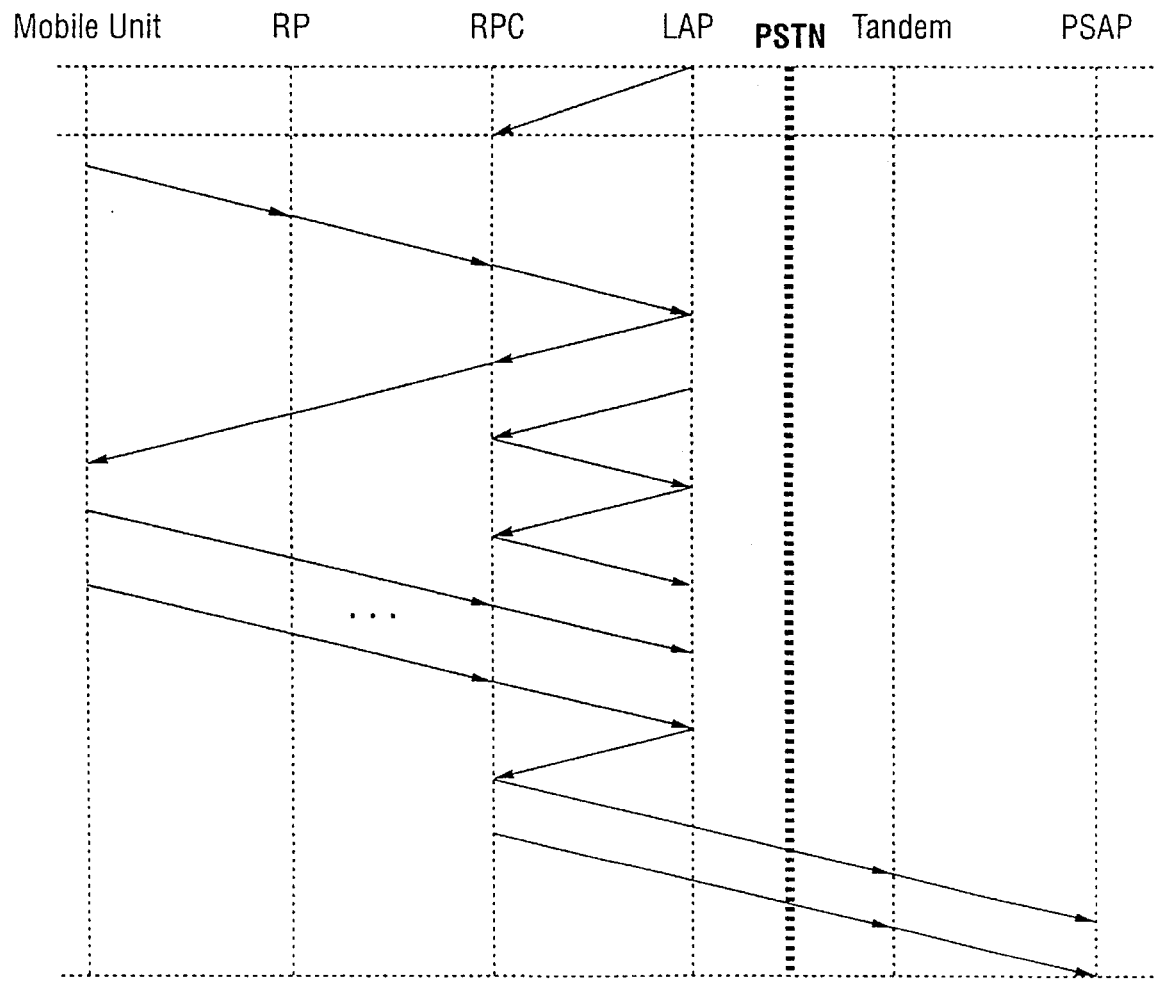
FIG. 5 is a flow diagram of an application programming interface disclosed for use with the present invention.

In keeping with the present invention, an Application Programming Interface (API) is required to trap desired calls based upon recognized bit patterns. As shown in FIG. 5, when used in a Personal Communications Network to trap emergency calls, for example, the PLS location processing interface will operate as follows: First, before any call processing, the LAP will send a Trap_Calls_Request message 74 to the RPC for each call type the LAP wishes the DRPC to trap. The message will contain a bit pattern specifying the call type, and a flag specifying whether or not the RPC should suspend the call while the LAP is determining location. When a caller makes an emergency call, the call will be forwarded 76 to the nearest available RP. Upon receipt, the RP will similarly forward the call 78 to the DRPC.

When the RPC receives a call type that matches a pattern specified in a previous trap calls request message (an emergency call in this example), the call will be suspended and a Trap_Satisfied message 80 will be sent to the LAP containing the call type, the radio port ID that received the call, and a transaction ID that the RPC and LAP will use during the remainder of this location processing.

Thereafter, the LAP will send a Get_SU_Data request 82 to the DRPC. The RPC uses the transaction ID to identify the particular subscriber unit, i.e. mobile unit, and sends a layer 2 REQ_SU_RF data message 84 to the Subscribing Unit (mobile unit). Upon receipt of this message, the LAP will send a GET_NRPL_Request to the RPC 86 to obtain a list of the neighboring Radio Ports surrounding the SU. Upon receipt of the Get_NRPL request message 84, the DRPC will send a Get_NRPL_Reply 86 to the LAP containing a list of Radio Port IDs and each port's status and operating frequency. The RPC will thereafter send a Get-NRPL-Reply 88 to the LAP. Next, the LAP will send a Get_Uplink_Data_Request 90 to the RPC for each radio port in the neighboring radio port list. The RPC will then send a Get-Uplink_Reply 92 to the LAP as well as a layer 2 REQ_RP_RF_Data message to each Radio Port in the neighboring Radio Ports List specifying the particular SU and its current frequency.

Each radio port will thereafter instantaneously jump to the SU's frequency, take the appropriate RF measurements (RSSI, WER, QI, TD, etc.) and report the results to the RPC via a layer 2 RP_RF_Data message 94. The DRPC will thereafter forward the radio port measurements to the LAP by sending multiple Get_Uplink_Data_Reply messages 96.

Next, the SU sends multiple layer 2 SU_RF_Data messages 98 to the RPC, one for each entry in its SU/handset table similar to that shown below:

| MOBILE UNIT/HANDSET TABLE | | | |
|---|---|---|---|
| RPID | RSSI | WEI | OI |
| →1 | −65 | 1 | 20 |
| 3 | −75 | 5 | 12 |
| 4 | −80 | 15 | 5 |

The table similar to the above mobile unit/handset table, is contemplated by Applicants to reside in the handset with certain architectures such as PACS. Alternatively, a list may be generated by Radio Ports in the neighboring area for other architectures. This table contains a list of RPs that the handset can "hear", i.e., neighboring base stations, along with the up-to-date downlink measurements. There is also an indication of which RP the handset is currently communicating with. As shown by way of example in the above table, RPs 1, 3, and 4 are neighboring Radio Ports. The handset is also currently communicating with RP 1, as designated by the "→" symbol.

The measurements stored in the handset only represent the downlink signals—those signals that the handset/SU receives from the RP/base station. In order to achieve a highly accurate location estimate, a similar table is contemplated to be needed which represents the uplink signals.

In operation, the neighboring Radio Port table is stored in the LAP and is populated during a location call. Upon notification of a location call, the LAP requests the RPC for neighboring Radio Port measurements. The RPC then sends messages to the RPs in close proximity to the RP that is communicating with the handset. Each RP that receives this message temporarily switches to the frequency that the location handset is communicating on. This frequency shift allows the RP to gather the uplink signals. The RP then sends the uplink measurements to the RPC. The RPC then forwards these measurements to the LAP.

An example neighboring Radio Port table is shown below.

| NEIGHBORING RADIO PORT TABLE | | | | |
|---|---|---|---|---|
| RPID | RSSI | WEI | OI | Operational Status |
| 1 | −60 | 6 | 10 | In Service |
| 2 | — | — | — | Out of Service |
| 3 | −75 | 20 | 12 | In Service |
| 4 | −90 | 41 | 28 | In Service |

As seen, the neighboring Radio Port table is nearly identical in structure to the mobile unit/handset table, with one additional field. The LAP needs to know the operational status of all neighboring RPs. If an RP is out of service, the LAP must be aware of this, as this could greatly affect the location processing. For example, FRP #2 is located very close to the RP #1, but is currently out-of-service, the LAP must know to exclude this RP from the real-time location processing.

Note that some architectures, particularly the current cellular architectures, do not have current provisions for generating the so-called "handset table" discussed above. However, the location technique and emergency access method described herein can still be made operable in accordance with this invention. The lack of handset data in the downlink direction merely means that some location accuracy and precision may be comprised as a reduced set of data and possibly reduce the precision of the location estimation.

Referring still to FIG. 5 of the drawings, following a generation of multiple layer 2 SU_RF_Data messages 98 to the RPC, the RPC will forward the SU measurements to the LAP by sending multiple Get_SU_Data_Reply messages 100. Thereafter, the LAP will send SU_Location to the RPC 102. The RPC will resume the call and forward the same to the PSTN (9-1-1) tandem switch 104. The tandem will perform selective routing and will forward the call to the PSAP 106. Finally, the RPC will send location, for example via voice synthesis, to the PSAP 108.

Location Processing

Each of the systems referenced above requires detailed location processing utilizing scaled contour shapes which are modeled based upon determined RF measurements for each base station. The location processing of the present invention focuses on the ability to predict and model RF contours using actual RF measurements, then performing data reduction techniques such as curve fitting techniques, Bollinger Bands, and Genetic Algorithms, in order to locate a mobile unit and disseminate its location. An example of a suitable software analysis tool is a program by Axcelis, Inc. termed "Evolver 2.0". This is an Axcelis spreadsheet program that can perform a genetic algorithm optimization of the parameters generated in the above curve fitting techniques.

More specifically, the method steps include modeling determined RF measurements for each of the base stations as a scaled contour shape having minimum and maximum boundaries which is capable of being projected on a mapping system such as an orthophotograph which may be digitally recorded. Thereafter, it must be determined which of the base stations can be "heard" by the mobile unit, i.e., which base stations are neighbors of the mobile unit. Once this information is known, it may further be determined where the corresponding contours of the neighbor base stations intersect so as to define a bounding polygon area that describes the position of the mobile unit in terms of a minimum and maximum error estimate.

Once the above information is known, the center of the bounding polygon area formed by the intersection of the projected contours of the neighbor base stations may further be determined. From this information, the latitude and longitude for this center may be calculated and there may be further determined in cooperation with a location databank, the exact street addresses contained within the bounding polygon area.

As readily seen, a key component of the present invention is the ability to diagram and model the RF propagation loss from a given Base Station/Radio Port, for various RF measurement arc segments, which will define entire contours. As those skilled in the art will recognize, in theory, if the "free space" power loss is known for all useful distances in all directions from a base station, then individual circular power loss contour shapes may be drawn around the base station. Assuming two or preferably three base stations are neighbors of the mobile unit, then RF measurements may be used to determine location via intersecting contours. The particular shape of the contour intersections is the bounding polygon that describes the location, in terms of the maximum error estimate.

Unfortunately, the principle of free space loss rarely exists when attempting to predict base station coverage areas since the surrounding buildings, trees, traffic signs and other geographical "clutter" blocks transmitted signals. To account for these variables involved in propagation prediction, the present invention therefore utilizes a number of segmented models and analysis techniques for data reduction purposes. The resulting output becomes the location databank which consists of a collection of component databases, many of which may be designed on a per base station basis. The component databases may include a base station database, a prediction database, a measured RF database, a generic curve fit database, a Bollinger band database, equipment-specific corrections database, and a run-time database as described in further detail below.

Base Station Database

In keeping with the invention, the base station database provides a detailed list of the attributes of every installed and proposed base station. Applicants contemplate that this database would contain the following data elements:

1. Name or identification of base station.
2. Base station vendor name, model number, serial number.
3. Latitude (LAT), Longitude (LONG), or at least accurate street location detail for conversion to/from LAT and LONG, and Altitude (ALT) of physical placement of base station.
4. Base station transmitter default power, instantaneous power for each active transmission channel, and power range.
5. Antenna gain contours (if omni-directional, otherwise sector make-up, and gains within each sector).
6. Whether or not a distributed antenna scheme is used, and if so, placement (LAT, LONG, ALT) of all remote antennas.
7. Nearby surrounding obstructions (e.g., the mounting surface of the RP: is it on a metal wall, in an elevator, or hanging in free space).
8. Base station transmitter operating frequency band (licensed, unlicensed), and allowed frequencies.
9. Whether or not a duplicated transmitter is used, and if so, include the identifying characteristics of each transmitter.
10. The PSAP associated with each base station.
11. Type of air interface: protocol and signaling (e.g., PACS, CDMA, GSM, DECT, CDMA, PHS-PHP, IS-54, IS-95, PCS-1900, B-CDMA, etc.) This information should be derived from the base station vendor name, model number, and serial number. Any dual or multi-mode capabilities must also be known and characterized.
12. Base station antenna gain contour. This information could be derivable from knowledge about the antenna's characteristics and surrounding obstructions.
13. The control unit associated with the base station, neighboring communication network topology and the associated central office. This information may be derived from knowledge of the control unit and its connected central office at the time the wireless communication system is originally engineered. Nonetheless, the network topology may change, due to a variety of reasons. For example, future base stations may use a signaling protocol arrangement with their control unit such that the base station can be easily moved around without prior notification to a centralized work manager system. A control unit may automatically discover the addition/deletion or in/out change of a particular base station. To the extent this automatic capability exists, a forwarding event report message must be sent to a system associated with the location service. In cases where the control unit is associated with a PBX, foreign exchange circuit, or similar remoting facility, the identification and end-to-end topology circuit arrangements will be needed.
14. Frequency Assignment Characterization (FAC). This should be derivable from the RP vendor, make/model information. If the FAC is automatic, then a potential incompatibility may exist during the performance of the location function. Knowing these details, and/or having the ability to control the occurrences of frequency assignment, can resolve incompatibilities.
15. Current operational RP status. This information should be derivable from the wireless communication network OAM and P systems that should routinely receive current information about the in-service state of the base stations. This information is needed, for example, because a planned, but not in-service base station, or a faulty base station, could disturb the location algorithm, if this information is otherwise not known.

16. Traffic load characteristics of the base station and its superior network. This may be derivable from the network planning activity, base station model characteristics, and dynamic monitoring by OAM and P systems, or each base station. For example, if a base station needed to perform an emergency location function, it cannot be invoked because it is at 100% of capacity, with no possibility to shed "non-emergency" load, then other techniques may be applied.

Prediction Database

This is a planning database primarily populated by, and used to support/interact with base station site planners and installation engineers. In accordance with the invention, it is used primarily to predict coverage. The location function accesses this database in order to require a rudimentary understanding of intended coverage area of newly planned cell sites and their operational status. Using the various RF propagation models and special plane curves, propagation coverage will be predicted for all base stations by examining the placement of the base station, local street widths, and the surrounding clutter. This provides a quick, inexpensive estimate of each base station's coverage.

Measured RF Database

In keeping with the invention, the measured RF database consists of actual measurements taken from the area surrounding the base station. These measurements could be taken by technicians during base station site installation or any other collection technique. Both uplink (handset to base station) and downlink (base station to handset) measurements will be made for data such as Received Signal Strength Indicator (RSSI), Word Error Rate (WER), Quality Indicator (QI), and Time Differential. Each of these variables are known to those skilled in the art and will therefore not be discussed in further detail. These measurements will be recorded along with the exact location at which the measurements were taken. All measurements are made within an arc segment region as discussed in further detail below.

Generic Curve Fit Database

This database is contemplated for use in accordance with the invention when no equipment-specific data is required/available. The generic curve fit database is created in the following manner:

1. Using the measurements database, load the data for each measurement type (i.e. $RSSI_{down}$), per an arc segment region, and per a base station, into a curve fitting program. One such program known to applicants is Table Curve 2D distributed by Jandel Scientific Software. Using any random or pseudo-random method, "holdback" 15% of the data points from the curve-fitting exercise, to be used as verification points later. This process will produce an equation for each measurement type, per region.

2. Inspect the resulting graphs for each measurement. Measurements that produce smooth, well-fit curves will be noted.

Figure 6A:
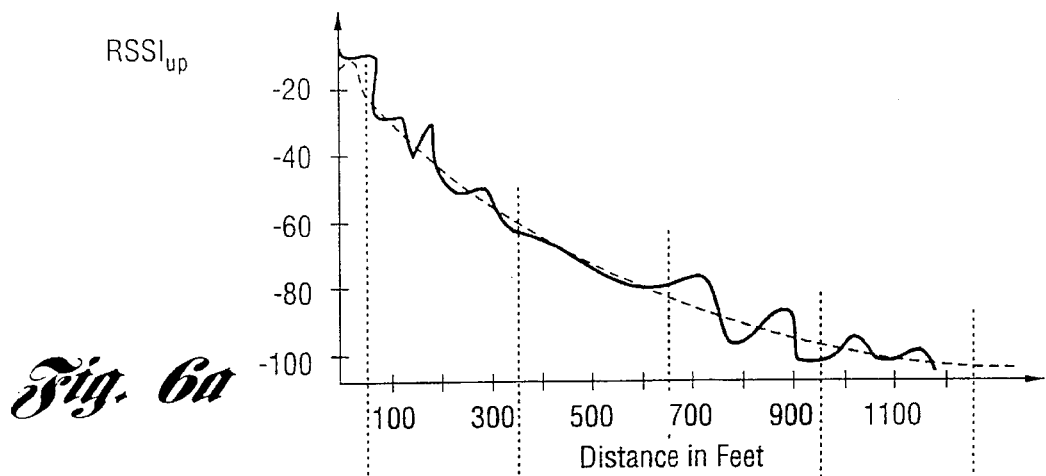
FIG. 6 is a representative curve fit graph obtained from the generic curve fit database used in accordance with the present invention.
Figure 6B:
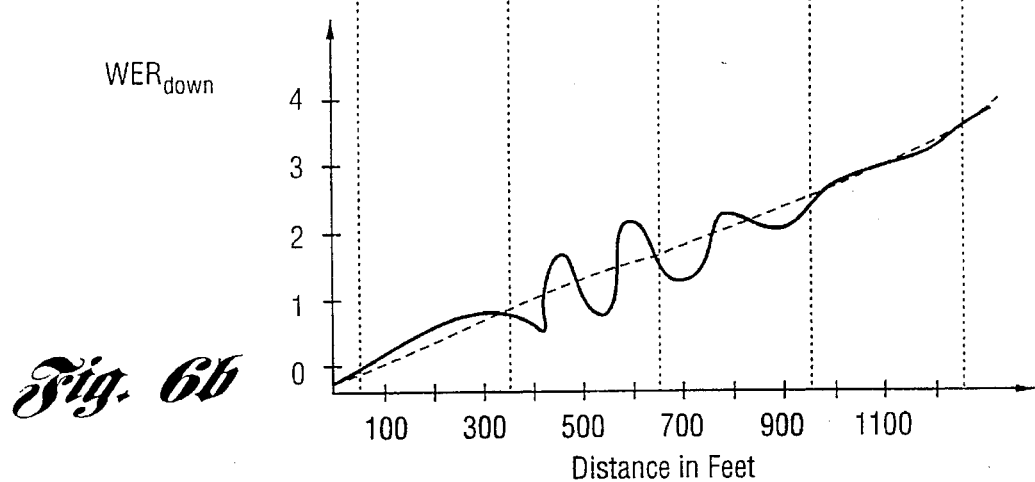

3. Simultaneously inspect all graphs for a given region. If one measurement produces a much smoother graph than the others, determining location in that region will require only one parameter. Alternatively, there may be areas within the region that correlate well with some measurements and poorly with others. As shown in FIG. 6, for example, it can be seen that the correlation in area A is fairly good for WER and poor for RSSI. Similarly, the correlation in area B is good for RSSI and poor for WER. These graphs suggest that determining location will require multiple parameters. In the example of FIG. 6, WER would be used in areas A and D, RSSI would be used in area B, and another measurement would be used in area C.

4. Test the equations by using the data points that were excluded from step 1. If the results are satisfactory, go on to the next step. If the error-bounds are too large using the existing equations, it may be necessary to use genetic algorithms to enhance the predictive technique for the region. Genetic algorithms could be used here to simultaneously combine the six (or more) equations in every conceivable manner to produce the best fit.

5. Store the equations for each region in the location database for use during a location request, along with the error estimate.

By analyzing the surrounding characteristics for each model region (i.e. street width, distance from base station to nearest building, etc.) along with a corresponding location equation, it may be possible to reuse this information in a predictive manner for future base station installations. Applicants contemplate that this could reduce costly manual RF measurement testing.

Bollinger Bands

As known to those skilled in the art, the basic idea behind Bollinger Bands is to read data points and create a moving average and a moving standard deviation. The bands are determined by calculating the average of a certain number of data points plus and minus two times the standard deviation of the data. A "sliding window" is used for the volatility of the data. The optimal window size will vary with the condition of the data.

Figure 7:
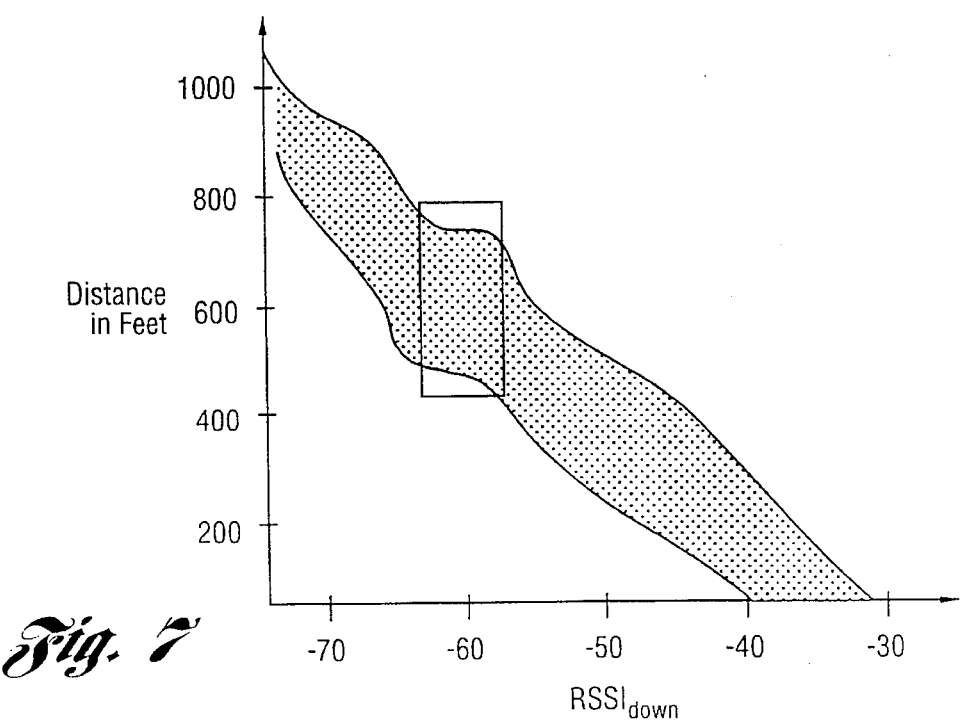
FIG. 7 is a schematic diagram of typical data obtained when utilizing a Bollinger band database in accordance with the present invention.

As shown in FIG. 7, Bollinger Bands provide: (1) the ability to handle discontinuities and vast multi-model, noisy search spaces; and (2) they optimize error wherever possible, i.e., wherever field measurements have a low volatility, then Bollinger Bands will generally have a low bandwidth, which results in a more accurate bounding polygon.

In accordance with the present invention and as explained in further detail below, RF measurements will be analyzed using the Bollinger band technique in the following manner:

1. Load the data for each measurement type (i.e. RSSI downlink), per arc segment region, into a program to calculate the sliding window average and standard deviation.

2. For each distinct measurement value (e.g. –70 Db, –71 Db, –72 dB, etc.), store the measurement value and the corresponding average distance (in feet) in both the upper and lower band (in feet), based on the sliding window.

Equipment-Specific Corrections Database

This database is contemplated for use with the present invention if vendor-specific, and/or model-specific equipment characteristics are available and are used in the areas of interest, which deviate from the generic curve fit database assumptions. For example, in GSM, different vendors use slightly different mapping or transfer functions, in relating true Word Error Rate, with the vendor's quantized indicator. It is anticipated that public, open standards will be defined, that mitigate the need for the Equipment-Specific Corrections Database. Data for this database would normally be provided from lab tests performed by mobile unit manufacturers, which are then used for correction purposes with respect to the generic curve fit database, and its assumed internal baseline standard.

Run-Time Database

This database is contemplated by Applicants to be stored directly in the format of the GIS software being used (e.g. map info or ARC/info). It is derived from the data reduction processes, for example, the curve-fitting in Bollinger Band databases. Each arc segment per base station contains a number of entries. The first entry defines the independent variables used to calculate location within this arc segment. There is also one entry for each distinct measurement value of the independent variables selected (e.g. RSSI down =−70 dB, −71 dB, −72 dB, etc.) These entries are actually graphical objects (bounding polygons) that are selectable by the GIS software.

Figure 14:
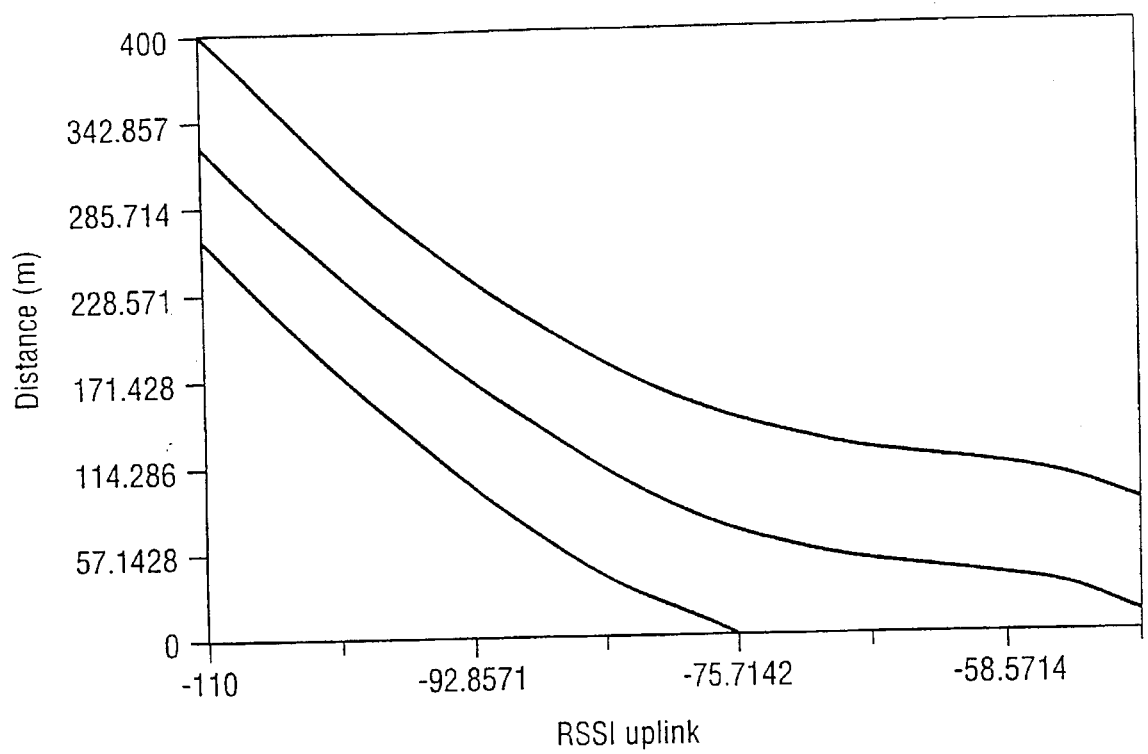
FIG. 14 is a schematic diagram of a best fit confidence interval with maximum and minimum bands.

For example, with reference to FIG. 14 and the table below, assume the curve fitting in Bollinger Band analysis for base station 1 has determined that $RSSI_{up}$ is the best location predictor for arc segments 1, 2 and 3, while $WER_{down}$ is the best predictor for arc segments 4 and 5. The run-time database would contain the following entries:

| RUN-TIME DATABASE | |
|---|---|
| Arc Segment | Predictor Variable |
| 1 | $RSSI_{up}$ |
| 2 | $RSSI_{up}$ |
| 3 | $RSSI_{up}$ |
| 4 | $WER_{down}$ |
| 5 | $WER_{down}$ |

Figure 8:
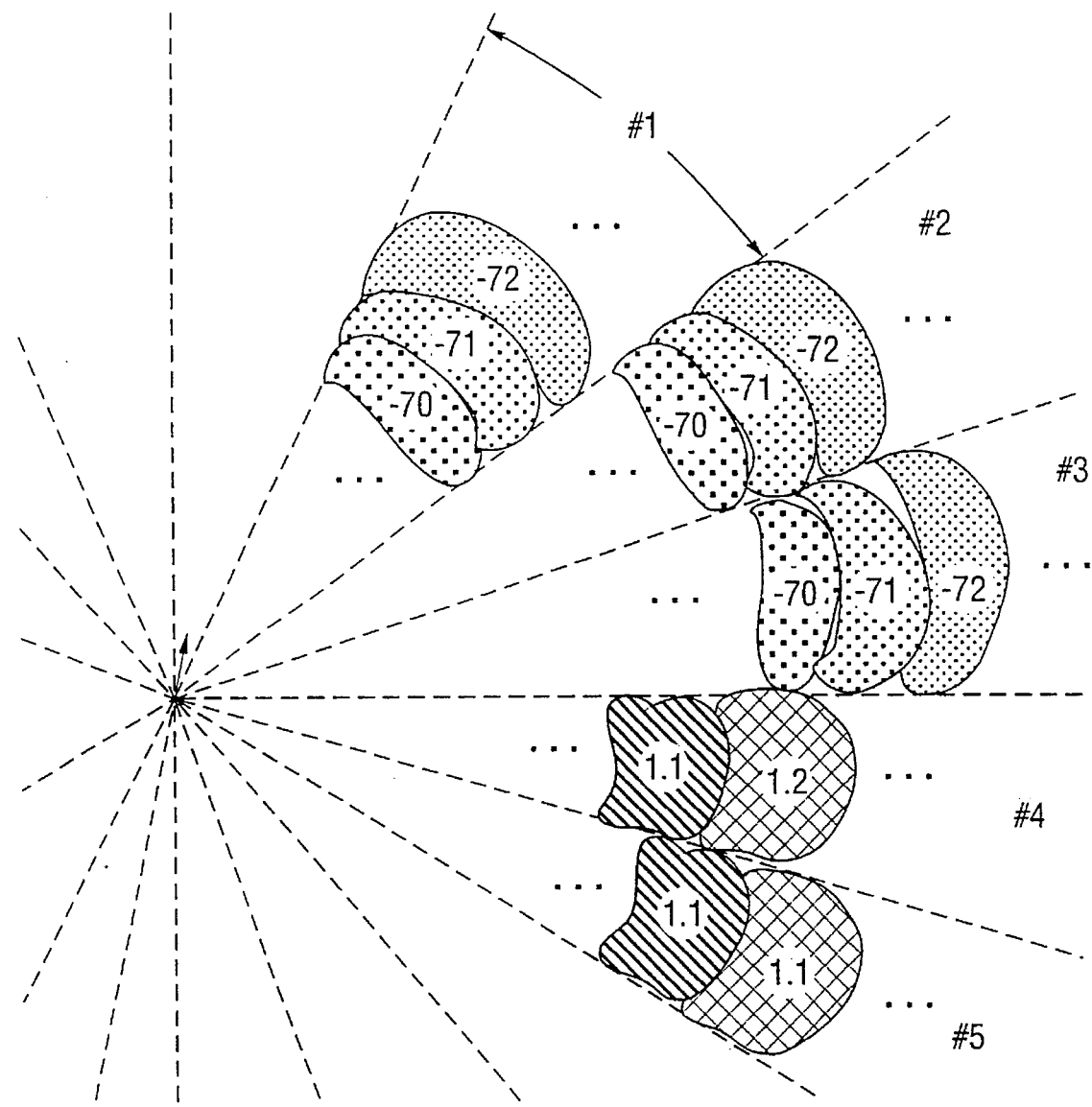
FIG. 8 is a schematic diagram of representative bounding polygons obtained by using the run-time database in accordance with the present invention.

In addition, the database would contain many bounding polygons per arc segment. FIG. 8 illustrates this concept for the five arc segments mentioned. In this Figure, the bounding polygons for $RSSI_{up}$ values of −70 dB, −71 dB and −72 dB are displayed for arc segments 1–3. Additionally, the bounding polygons for WER down values of 1.1% and 1.2% are displayed for arc segments 4 and 5. While only 2–3 bounding polygons per arc segment are displayed in the Figure, there would actually be many polygons to cover the entire range for variable being used.

The run-time database is displayed with one predictor variable per arc segment as shown above. The Position Location System (PLS) process will actually use more than one predictor variable per arc when a single variable does not reliably predict distance. The run-time database for each arc segment will be constructed by using the results of the curve fit and Bollinger band databases, and will actually consist of two tables. The first table will be used to construct a set of fuzzy logic rules, while the second table will provide a predicted distance value, along with a minimum and maximum boundary.

For example, if arc segment 1 of radio port 5 is predicted well by $RSSI_{down}$ for values of −40 dB to −70 dB, and $WER_{down}$ for values of 1% to 3%, the following entries would appear in the run-time database rule table:

TABLE 1

| Run-Time Database Rule Table | | | | |
|---|---|---|---|---|
| Radio Port | Arc Segment | Variable | Min Range | Max Range |
| 5 | 1 | $RSSI_{down}$ | −40 | −70 |
| 5 | 1 | $WER_{down}$ | 1.0 | 3.0 |

The second table for arc segment one would contain entries such as these:

TABLE 2

| Run-Time Database Values Table | | | | | | |
|---|---|---|---|---|---|---|
| Radio Port | Arc Segment | Variable | Value | Mean Dist | Min Dist | Max Dist |
| 5 | 1 | $RSSI_{down}$ | −40 | 100 | 0 | 200 |
| 5 | 1 | $RSSI_{down}$ | −41 | 120 | 20 | 220 |
| 5 | 1 | $RSSI_{down}$ | — | — | — | — |
| 5 | 1 | $RSSI_{down}$ | −70 | 500 | 400 | 600 |
| 5 | 1 | $WER_{down}$ | 1.0 | 400 | 350 | 450 |
| 5 | 1 | $WER_{down}$ | 1.1 | 440 | 390 | 490 |
| 5 | 1 | $WER_{down}$ | — | — | — | — |
| 5 | 1 | $WER_{down}$ | 3.0 | 800 | 700 | 900 |

During a location request, the LAP would access the run-time database rules table and construct the following code to determine the caller's predicted distance from radio port 5 for arc segment 1:

Pseudo-code:

```
rule_1 = FALSE
rule_2 = FALSE
/* look for active rules */
if −70 <= RSSI_down <= −40 then
    rule_1 = TRUE
if 1.0 <= WER_down <= 3.0 then
    rule_2 = TRUE
if rule_1 is TRUE and rule_2 is TRUE
    /* both rules apply, so we have to perform a weighted average using
       the difference between predicted max and min */
    weight_1 = (RSSI_down max−RSSI_down min) /
               (RSSI_down max−RSSI_down min+WER_down max−WER_down mean)
    weight_2 = (WER_down max−WER_down min)/
               (RSSI_down max−RSSI_down min+WER_down max−WER_down mean)
    /* reverse the weights because the one with the smaller difference
       is better and should be weighted more heavily */
    mean = weight_1*WER_down mean + weight_2*RSSI_down mean
    min = weight_1*WER_down min + weight_2*RSSI_down min
    max = weight_1*WER_down max + weight_2*RSSI_down max
else if rule_1 is TRUE
    use RSSI_down mean, min and max
else
    use WER_down mean, min and max
```

Figure 9:
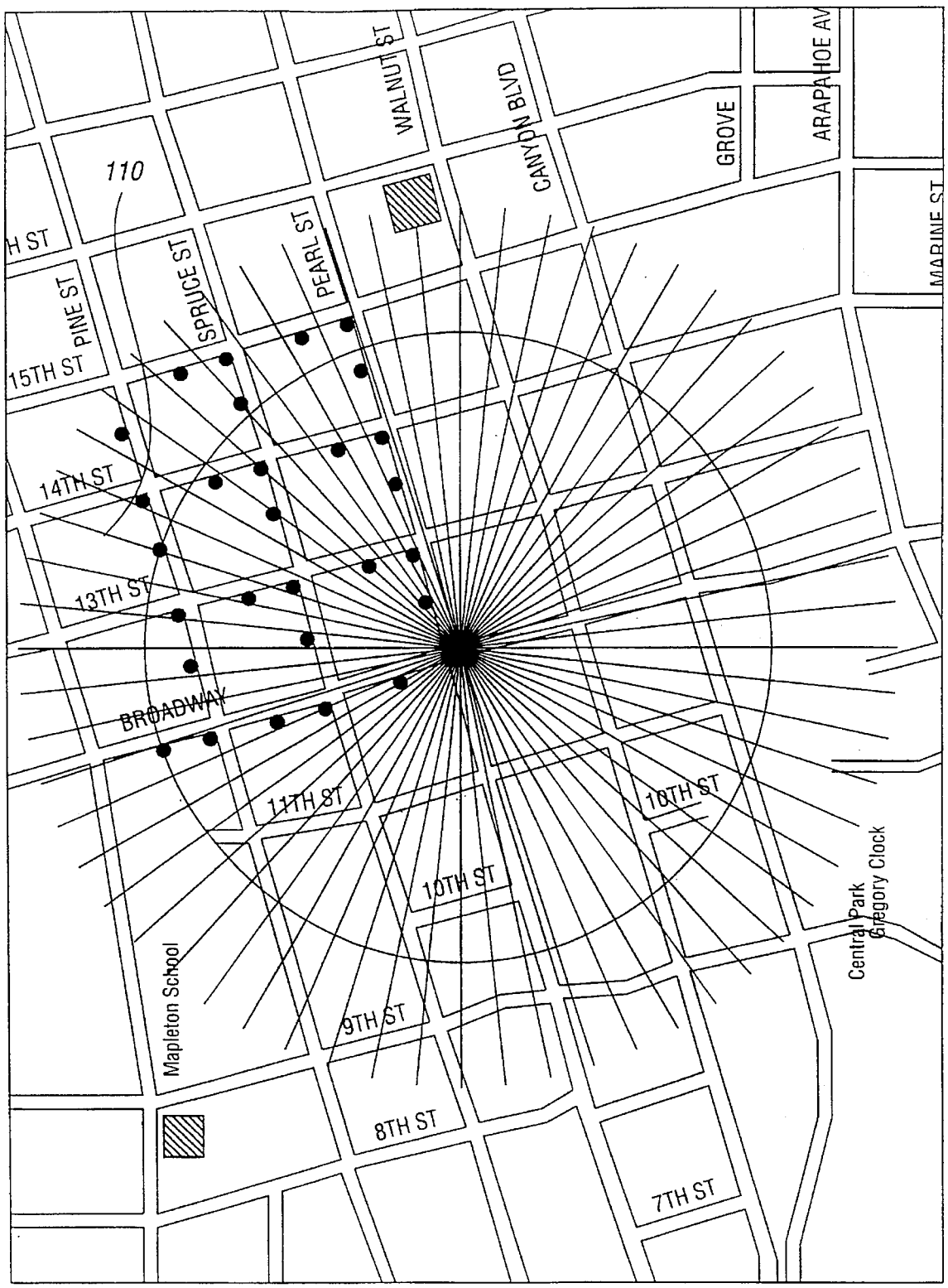
FIG. 9 is a schematic diagram of representative arc segments drawn around a Radio Port.

The detailed steps of preparing the run-time database and thus the PCS location databank may be illustrated with reference to FIG. 9 of the drawings. FIG. 9 is a schematic diagram of a Radio Port that has arc-segments 110 of 6 degrees. The arc-segments create discrete sections of the area around the Radio Port. With these sections clearly defined, the RF behavior of the Radio Port can be characterized in each section independently. After the locations have been partitioned into arc-segments, a spreadsheet file can be produced for each arc-segment.

The preparation steps include the initial gathering of field data. The desired parameters ($RSSI_{up}$, $RSSI_{down}$, $WER_{up}$, $WER_{down}$, $QI_{up}$, $QI_{down}$, etc.) will be collected at locations surrounding the Radio Ports. In a preferred embodiment, these locations will be approximately 10 meters apart from one another. All measurements will be placed with location tags in a suitable spreadsheet file such as, for example, Microsoft Excel.

The locations will thereafter be partitioned into arc segments 110 as indicated above. In keeping with the invention, the locations need to be partitioned into arc segments 110 in order to accurately model the parameters around corresponding Radio Ports. After the data has been collected and partitioned into arc segments, a suitable curve fitting program such as Table-Curve 2D will be used to curve-fit the data (distance versus each parameter) for each individual arc-segment. The software generates a list of functions that could possibly characterize the data and sorts the functions (best to worse) by means of lowest Fit Standard Error (FitStdErr).

Sometimes, the best fit (lowest FitStdErr) that the curve-fitting software packages produces is not the best fit for the RF data. There are many different examples of the software package fitting a curve to the data that is not physical (not possible in the RF environment). Some examples of nonphysical fits are fits that swing into negative distances, fits that have high sinusoidal content, and fits that have many slope reversals or large swings in areas where few or no actual data points reside.

Figure 10B:
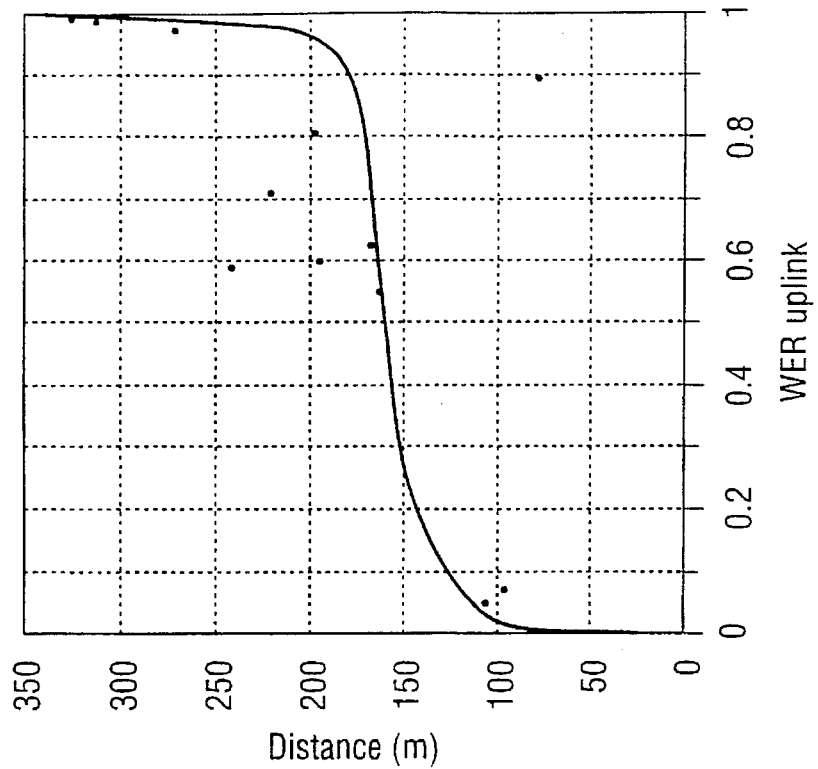
FIG. 10 is a schematic diagram of a first sample curve-fit data plot before and after a manual search.
Figure 10A:
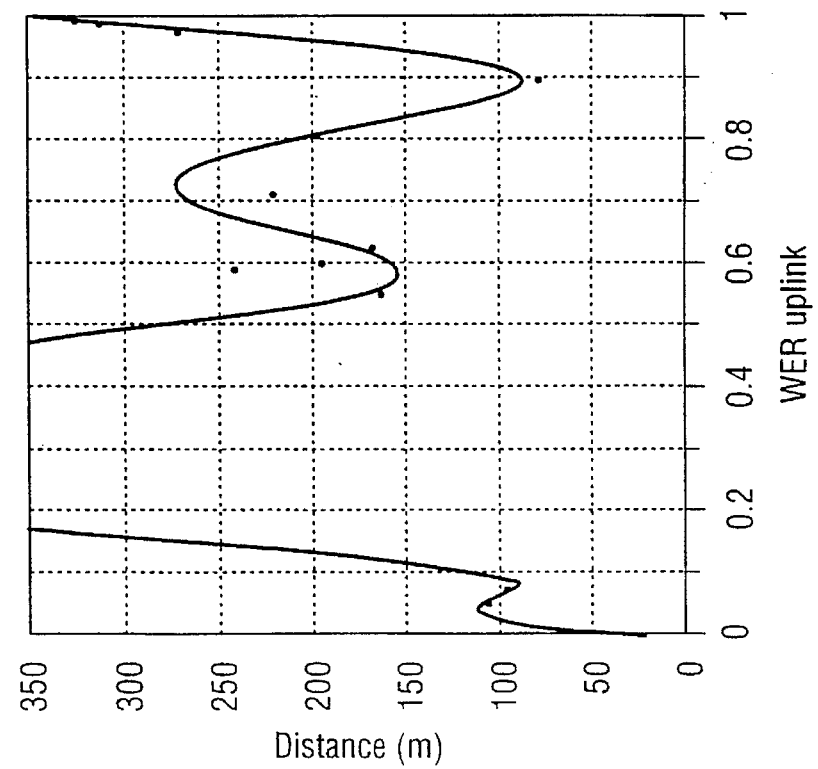

FIG. 10 illustrates two TableCurve 2D curve-fit on the same data. The plot on the left shows the curve-fit that the software package chose as the best fit (it is the fit with the lowest FitStdErr). One skilled in the art would recognize that the plot on the left is highly unlikely to be representative of the data because of the large swings where few data points lie. With the data from FIG. 10, a manual search for the most logical fit is needed. One skilled in the art would therefore search the fits until she found a fit that is more logical (like the fit on the right in FIG. 10).

Figure 11B:
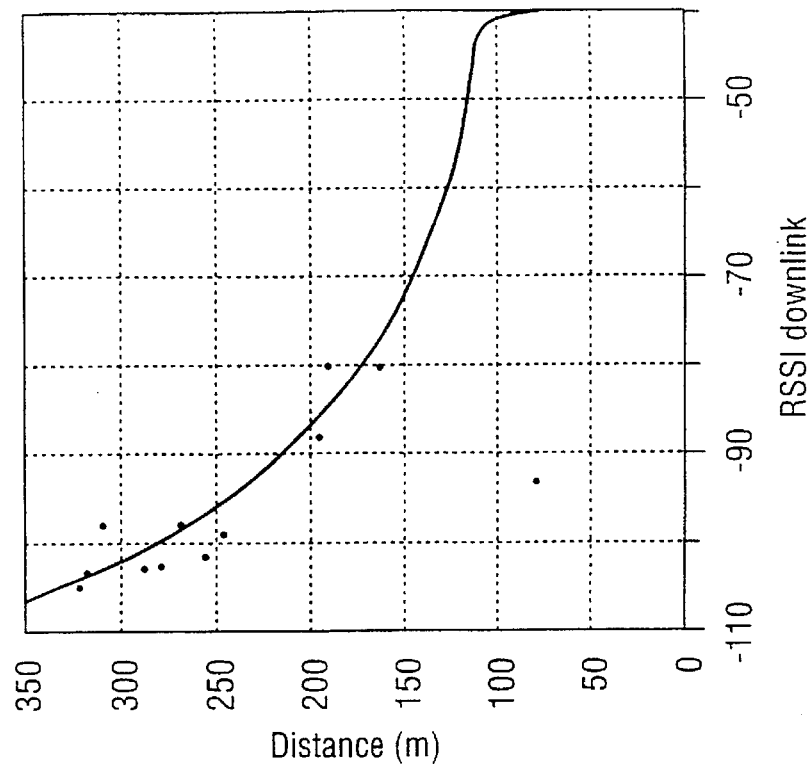
FIG. 11 is a schematic diagram of a second sample curve-fit data plot before and after a manual search.
Figure 11A:
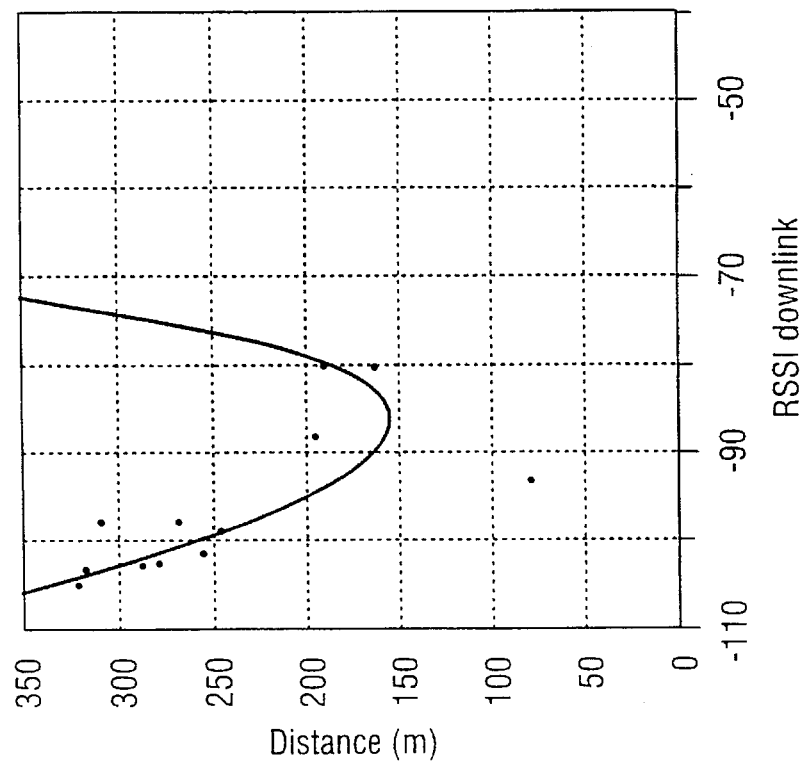

FIG. 11 provides another example of a TableCurve 2D fit that is not logical. The fit on the left has one swing to a very large distance (off of the top of the plot) in an area where there are no data points. The plot on the right is much more likely to describe the data accurately in the area where there are no data points, even though it has a higher FitStdErr than the plot on the left.

Figure 12B:
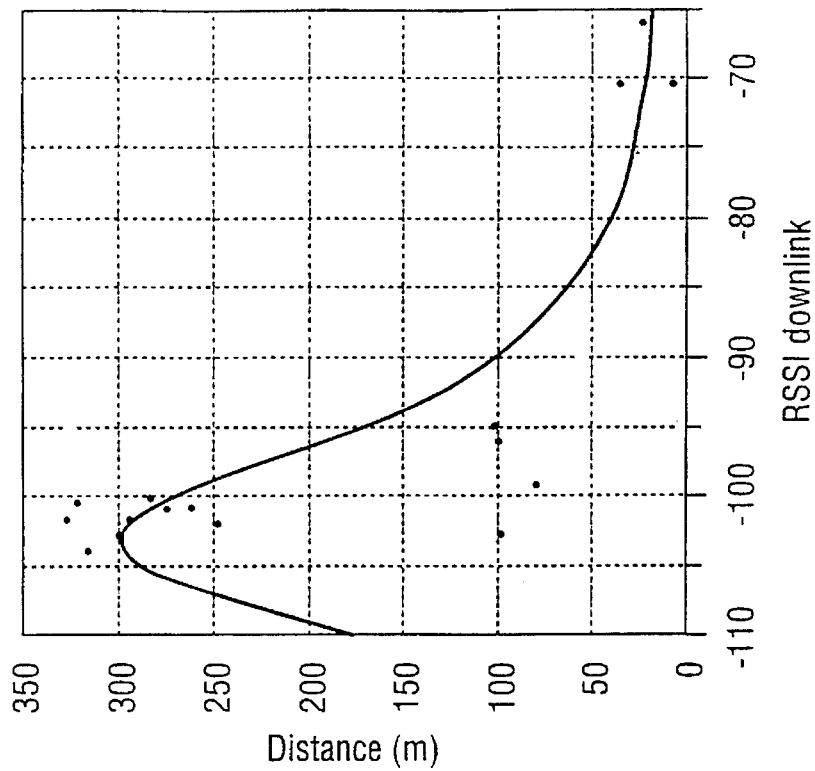
FIG. 12 is a schematic diagram of a third sample curve-fit data plot before and after a manual search.
Figure 12A:
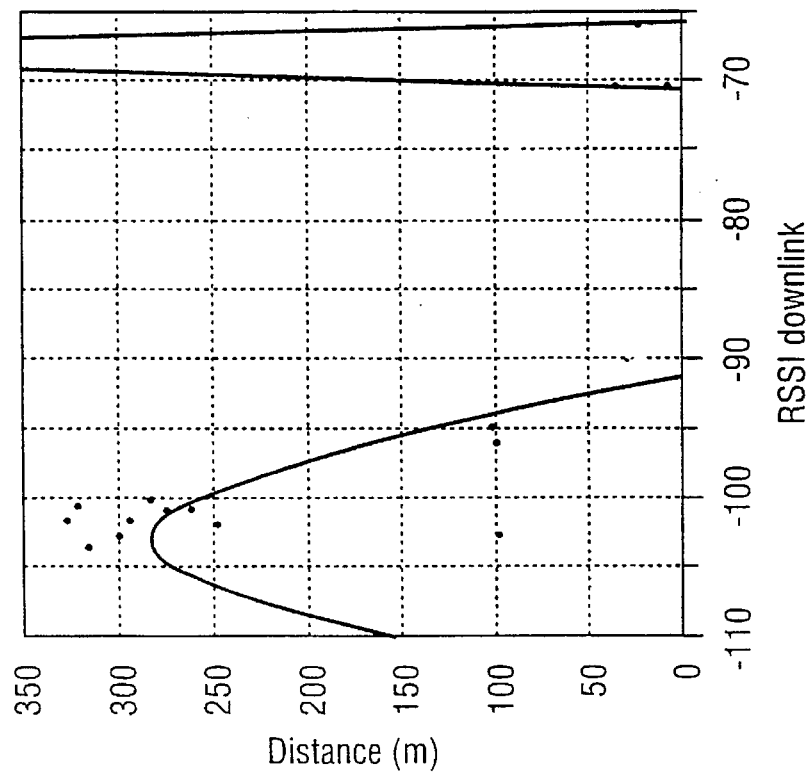

FIG. 12 illustrates yet another fit (left) that has a large negative distance swing (again, where no data points lie) and a sharp, large positive distance swing. In keeping with the invention, negative distances are not valid because they do not represent the RF environment properly. The sharp, large distance swing is not reliable because of the low number of data points in the area. The plot on the right has a much higher probability of being accurate.

Figure 13B:
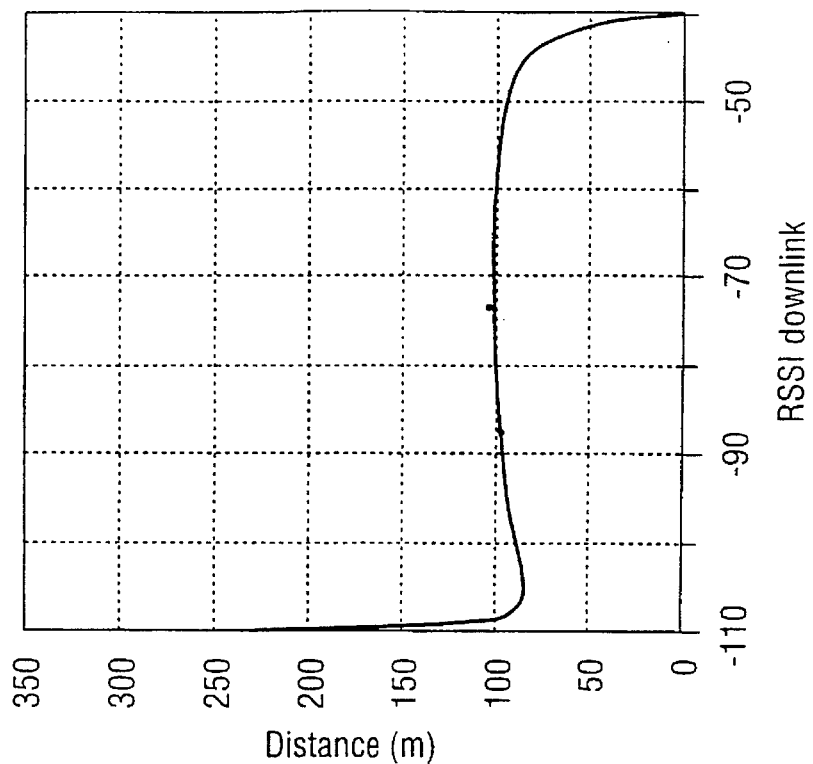
FIG. 13 is a schematic diagram of a fourth sample curve-fit data plot before and after a manual search.
Figure 13A:
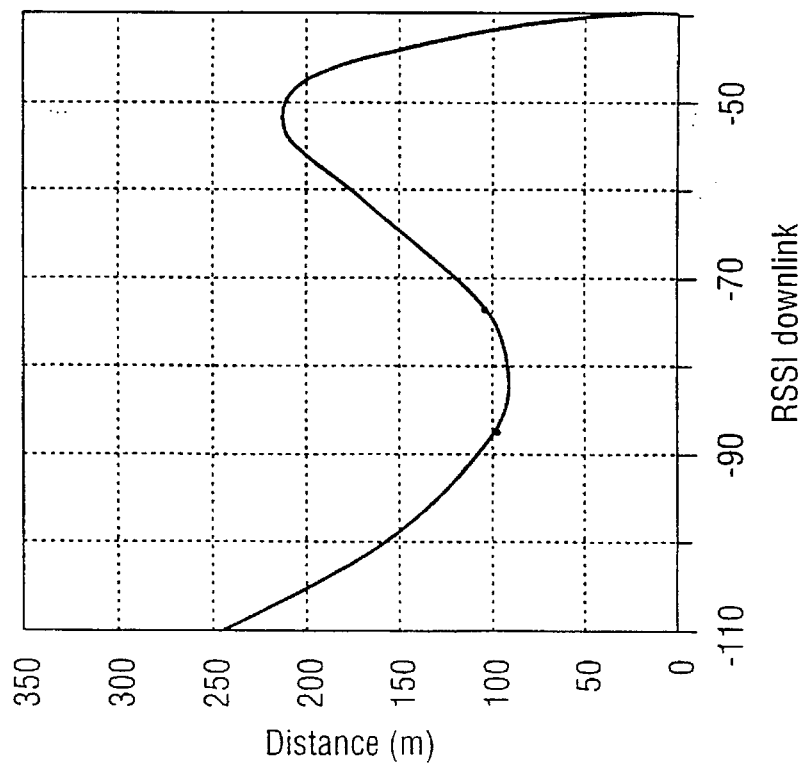

The lowest FitStdErr fit in FIG. 13 displays a more subtle problem. The points along the distance axis (vertical) are not well represented, yet they make up the majority of the data point population. The plot on the right better represents those data and also eliminates questionable swings that are in the left plot.

Although manually searching for the most logical fit may result in a larger FitStdErr, the fit will also be more representative of the actual RF environment. The number of invalid fits by TableCurve 2D, for example, can be minimized by collecting a high number (50–60) of evenly spaced data points within each arc-segment.

After the curve fitting program produces a valid fit, 95% confidence intervals (or bands) can be created. These bands (minimum and maximum) are produced by adding and subtracting twice the FitStdErr to the average fit. Any negative distances will be eliminated from the band. FIG. 14 shows a best fit with maximum and minimum confidence bands. It should be noted that through simple numeric integration, the area of the interval can be computed. The area of the band will describe how volatile the data is throughout a complete arc-segment.

Figure 15:
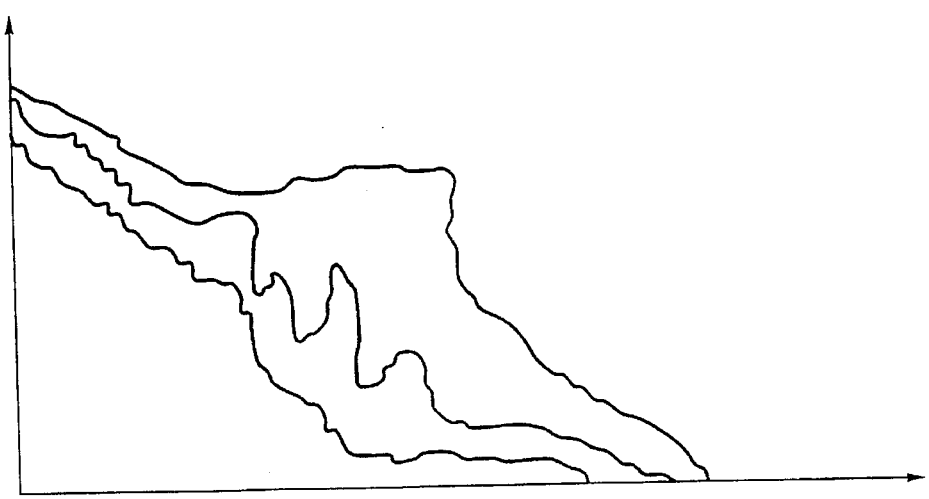
FIG. 15 is a schematic diagram of a representative Bollinger band.

After the confidence intervals have been determined, Bollinger bands can be created for the data in each arc-segment 110. As indicated above, Bollinger bands are similar to the confidence intervals in that they represent a range in which data points are likely to reside. However, Bollinger bands widen according to the volatility of the data in a certain area of a particular arc-segment. Basically, the Bollinger interval is wide in areas where the deviation of the data points is large, and is narrow in areas where the deviation of the data points is small. FIG. 15 shows how Bollinger bands widen in areas of data volatility.

As discussed above, Bollinger bands use a "sliding window" technique to compute a moving average across a data set. The sliding window size for location purposes will be 20% of the data population for each arc-segment. As with confidence intervals, the area of the Bollinger bands can be computed through simple numeric integration. The advantage of the Bollinger band over the confidence interval is that the area of the Bollinger band in a discrete section of an arc-segment can describe the volatility of the data in that section. The area of the confidence interval can only describe the volatility of the data throughout a complete arc-segment.

A problem with Bollinger bands is that they have a phase lag that is introduced in calculating the moving average. Because of this phase lag, the Bollinger band widens slightly beyond the volatile data. The amount of phase lag is dependent on the size of the sliding window.

Figure 16:
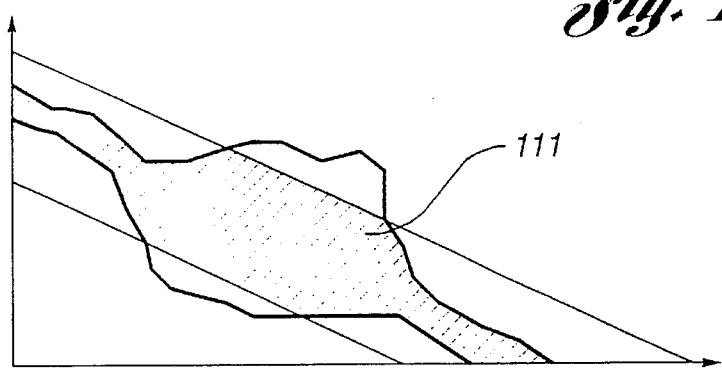
FIG. 16 is a schematic diagram of a location band.

To "clip" the phase lag, the Bollinger band and confidence intervals can be intersected. The intersection of these two bands becomes the location or distance band 111, as shown in FIG. 16. The location band 111 is what will be used to generate (for the location databank) minimum and maximum distances for any valid values of any of the parameters. The area of the location band 111 can be computed with simple numeric integration and is an indication of the data volatility.

At this stage, location bands have been produced for all parameters in each arc-segment. Now, a method of determining which parameters to use is needed. Fuzzy logic will be used to determine which parameters will be used when estimating a distance. Fuzzy logic, as known to those skilled in the art, consists of fuzzy patches or rules which try to explain the behavior of fuzzy systems. Fuzzy patches or rules are simply if-then-else statements that describe a discrete section of the system's output. The goal is to have a group of fuzzy patches that accurately describe the system's complete output. In this location system, fuzzy rules will be created to use the parameters with the least volatility to estimate a distance.

Figure 17:
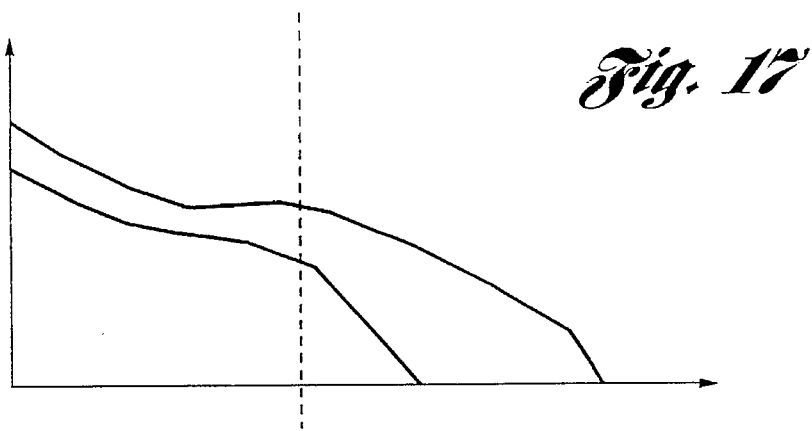
FIGS. 17–18 provide representative schematics of $RSSI_{downlink}$ and $WER_{uplink}$.
Figure 18:
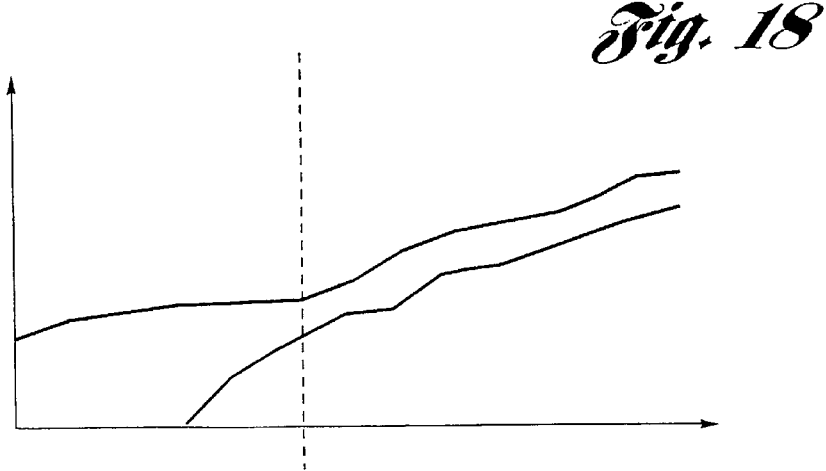

FIGS. 17 and 18 provide examples of two different parameters from the same arc-segment. An example of a fuzzy rule would be as follows: If $RSSI_{downlink}$ reading lies in the range to the left of the dashed line, use $RSSI_{downlink}$. Otherwise, use $WER_{uplink}$.

The above fuzzy rule is an over-simplified case, yet it illustrates the idea behind fuzzy logic. With all parameters being used, weighted averaging can be used to implement a combination of parameters in the fuzzy model. Fuzzy logic is flexible in allowing different parameters to carry different weights. In the location system of the present invention, the weights for the fuzzy logic averaging will be determined by the volatility of the data (used the measure of the location band area). In the "gray" areas of overlapping fuzzy rules, the overlapping rules are added together (with associated weights) and then the average of the curve will be used.

By preparing several individual parameter bands to get the smallest volatility within a "quantization", the best solution may be determined. Finally, the final solution may be compiled using fuzzy logic technique values. For example, in the pseudo code above, each of the database entries is weighted against one another such that the database entry of minimum volatility having the strongest predictor of distance at a particular location for particular values is obtained where more than one rule applies.

As known to those skilled in the art, fuzzy logic is a process where, unlike neural networks, more than one rule applies. The rules are averages in a predetermined weighing scheme. Unlike normal fuzzy logic rules, however, the weighting here pertains to minimum and maximum values. In keeping with the invention, volatility is used as an indicator of the best weight. The variable with the least volatility is weighted the most, however, other variables are not discounted.

In this manner, overlapping RF measurements may be utilized. Thus, 80% of WER and 20% of RSSI might be used in predicting location. The system and method of the present invention averages the minimum distances as well as the maximum distances which then become the min and max boundaries for each arc segment. This process is repeated for all other arc segments which permit a min and max bounding polygon to be drawn around a Radio Port. The process is thereafter repeated for neighboring Radio Ports as they are "heard" to determine the most accurate predicted bounding contours for the other neighboring Radio Ports. The resulting contours (i.e. the minimum and maximum contours) are thereafter drawn around each Radio Port, the intersections of which define the bounding polygon where the mobile unit can be located.

Because the Radio Port data is partitioned into separate arc-segments and then analyzed, there will be discrete jumps in the data between arc-segments. To improve the continuity of the data between arc-segments, a line will be added to help smooth the jumps. The slope of this line will roughly be the magnitude of the jump divided by some $\Delta X$ (where $\Delta X$ is 10–20% of the width of the arc-segment).

In keeping with the invention, the step of modeling the determined RF measurements as scaled contour shapes therefore requires segmenting the coverage areas of each of the base stations into a plurality of arc segments designated by reference numeral 110 in FIG. 9. For each of the arc segments 110, a plurality of single or multiple regressions must be performed so as to convert actual data into a corresponding plurality of mathematical curve-fit equations each representing a relationship between a predetermined measurable variable, i.e. RSSI, WER, etc. and distance from the base station. For each of the arc segments, the degree of fit must be determined of the corresponding mathematical equation by comparing each of the mathematical equations with actual data. The mathematical equations may thereafter be optimized by determining which has the best correlation and least standard error for a predetermined portion of each arc segment 110.

A genetic Algorithm (GA) may be used to optimize the parameters of each of the single or multiple regressions so as to further improve the degree of fit for greater correlation and minimum standard error. Still further, in cases where there is generally poor correlation between all of the mathematical equations of an arc segment and the actual data, the corresponding base station may be instructed along with the receiver, i.e., the mobile unit, to each temporarily change their transmission frequencies by 10–40 MHz. Thereafter, additional RF measurements may be obtained for the base station at the changed frequency, including its link budget, for the same predetermined plurality of distances and directions. As readily seen, this will increase the number of variables for consideration and analysis.

Figure 19:
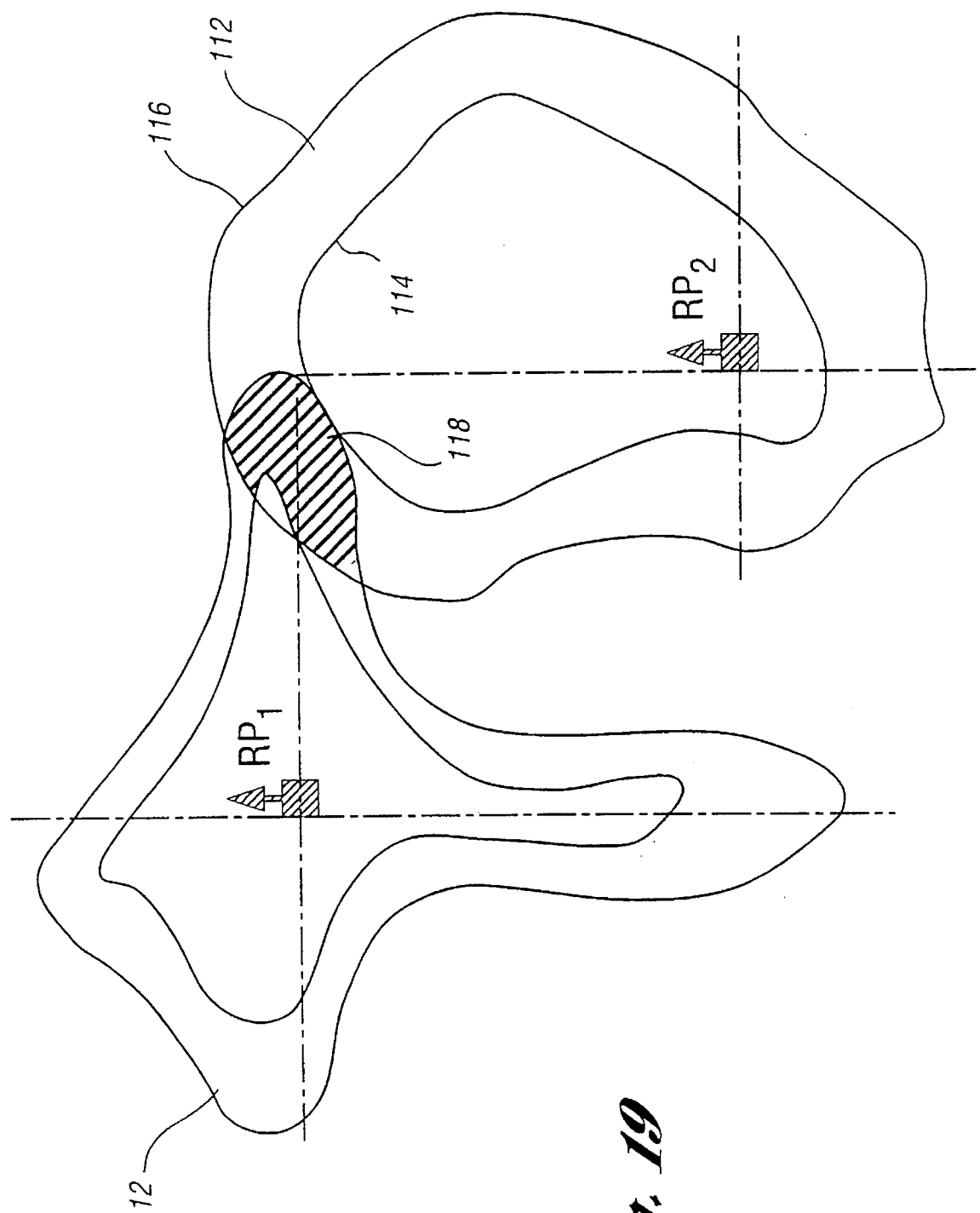
FIG. 19 is a schematic diagram of an example bounding polygon defined by two base stations.

The optimized mathematical equations for each arc segment are thereafter combined so as to form the scaled contours 112 such as that shown in the schematic of FIG. 19.

Each scaled contour 112 has minimum and maximum bounds 114 and 116. After these boundaries have been determined for an entire base station, minimum/maximum boundaries also define minimum/maximum contours, based on a given set of real-time measurements in both the uplink and downlink directions. This process is repeated for neighboring base stations, and the resulting intersection (if any) then define a min/max bounding polygon 118.

The polygon is then projected onto a mapping system such as, for example, an orthophotograph which may be digitally recorded, or similar means, with nearby street names as shown, for example, in FIG. 20. In a preferred embodiment, the entire picture may then be sent via a BRI-ISDN or FDDI circuit to a PC or work-station-based video collaboration system (or similar two-wave video system). When used in emergency situations, the video collaboration system would be located in the nearest PSAP. As shown in FIG. 20, the location processing steps of the present invention may be used to locate a "victim" determined to be about midway along Maple Street, as it intersects with Elm Street. Because the bulk of the bounding polygon 118 is along the North side of Maple Street, from an intuitive perspective, the "victim" is more likely to be on the North side of Maple Street.

In keeping with the invention, it should be noted that even in the degenerate case where only one base station's signal can be detected by the handset, min/max bounding bands around the base station, also projected on a high quality digital orthophotograph, can provide superior information to the emergency call taker and the PSAP as opposed to merely providing the base station generic coverage area, as a circle. For example, FIG. 21 shows that based on the RF measurements received, the "victim" cannot be at the same intersection as the base station itself, but rather elsewhere as shown. From a quick inspection of the bounding polygon, it is apparent that there is a strong possibility the "victim" is in Building 3 and less likely that the "victim" is in Building 2, or in the neighborhood park. This type of information, although unusual, could be used by search teams to be most efficient and fast in their task of actually finding the "victim" in accordance with the present invention even though only a very minimum amount of RF measurement data was available in real-time during the call.

Nonetheless, it should be noted that from a location accuracy and efficiency point, the above-described Integrated Services Digital Network (ISDN) approach which requires sending bounding polygon location via video, is contemplated to provide the user with the most accurate location details.

Figure 22:
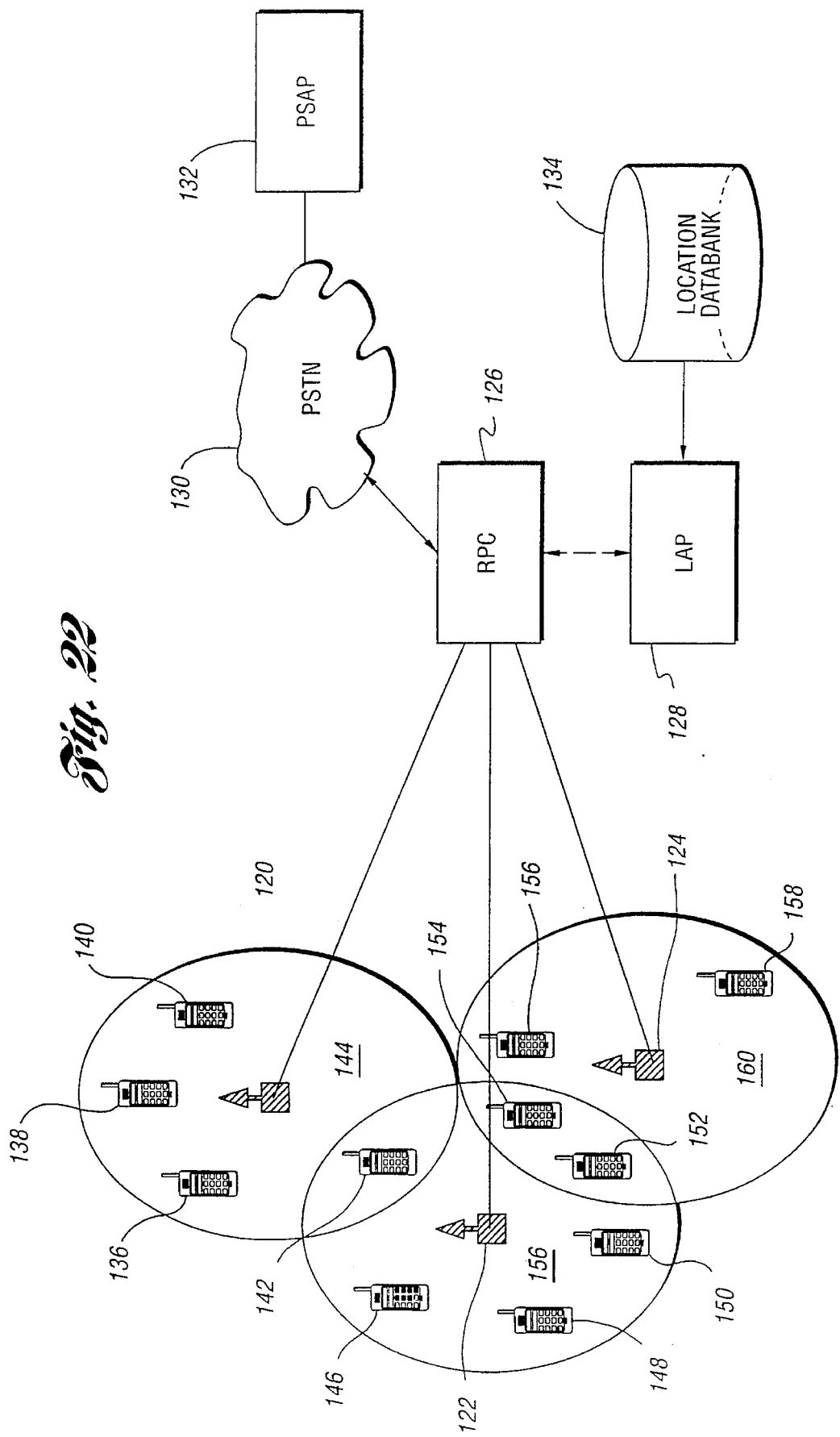
FIG. 22 is a schematic diagram of an emergency access call system in accordance with the present invention.

Armed with this location information, the present invention operates to identify all mobile units which are currently communicating with the corresponding base station. With reference to FIG. 22, for example, base stations 120, 122 and 124 are each shown in electrical communication with RPC 126. RPC 126 is, in turn, provided in electrical communication with LAP 128 and PSTN 130. PSTN 130 is provided in electrical communication with PSAP 132. Still further, LAP is provided in electrical communication with location databank 134. Each of the base stations 120, 122 and 124 are operative to communicate with a plurality of mobile units. For example, base station 120 is shown in electrical communication with mobile units 136, 138, 140 and 142 within the base station coverage area 144. Similarly, base station 122 is operative to communicate with mobile units 142, 146, 148, 150, 152 and 154 within its coverage area 156. Finally, base station 124 is operative to communicate with mobile units 152, 154, 156 and 158 within its base station coverage area 160.

In accordance with the invention, if a telephone call were originated from mobile unit 136 to RPC 126 via base station 120, then the network would identify mobile units 138, 140 and 142 as those mobile units which are currently communicating with base station 120 yet did not originate the emergency request call. Thereafter, predetermined uplink and downlink RF measurements would be extracted so as to determine the possible access of mobile units 138, 140 and 142 to neighboring base stations, i.e. Radio Ports 122 and 124 in the example of FIG. 22.

Through reference to these RF measurements, the wireless network may determine which of the non-originating mobile units, i.e., 138, 140 and 142 are also within the coverage areas of neighboring base stations. Once this information is known, it may thereafter be determined which of the neighboring base stations, i.e. 122 and 124 can support additional mobile units, if any. As those skilled in the art will recognize, this determination is made through reference to the current voice loading of the base station.

If such a condition exists, then an Automatic Link Transfer or handoff or handover, as the term may be used, will be initiated at one or more of the neighboring base stations. For example, if it is determined that mobile unit 142 may be handed off to base station 122, then an automatic link transfer will be initiated so as to clear up a voice channel such that mobile unit 136 may now properly communicate with base station 120. In the example shown, in order to effect the transfer of mobile unit 142 to base station 122, mobile units 152 and 154 may similarly be required to be transferred to base station 124. In this manner, mobile units are transferred from one base station to another so as to open up a voice channel for the emergency caller at its closest base station.

The mobile user, here mobile unit 136, will then be provided the opened channel for a provisioned period of time necessary to forward the E9-1-1 call to the PSAP 132 along with the precisely determined location of the originating mobile unit as determined in accordance with the location processing steps above. If, and only if, ALTs/handoffs/handovers will not open an interface channel, then a non-voice Emergency Alarm Call (EAC) will be generated for receipt by the PSAP 132. Unlike the prior art, however, the EAC will include precise location information, calling party ID, terminal ID, etc.

Significantly, the method of the present invention operates to open a voice channel and allow transmission of an emergency call during congested base station conditions without dropping existing calls.

The disclosed method thus simplifies the critical processing burden placed on the emergency call taker attendant at the PSAP 132 when multiple calls are initiated about one event, or at least one particular area. In addition, the call is of short duration, allowing for the rapid processing of subsequent calls to the PSAP 132. It is further anticipated that the EAC might also be used by speech and/or hearing impaired individuals, with the advantage being that no special Telephone Device for the Deaf (TDD) would be required.

Attention is directed to the fact that the method of the present invention is also applicable when using what has come to be known as smart antennas. As those skilled in the art will recognize, smart antennas are those which through the use of fixed or floating lobes, permit the same frequency to be assigned to different handsets. In such cases, not only would Automatic Link Transfers/handoffs/handovers be analyzed with respect to neighboring RPs but, in addition, within the lobes of each smart antenna itself.

Figure 23:
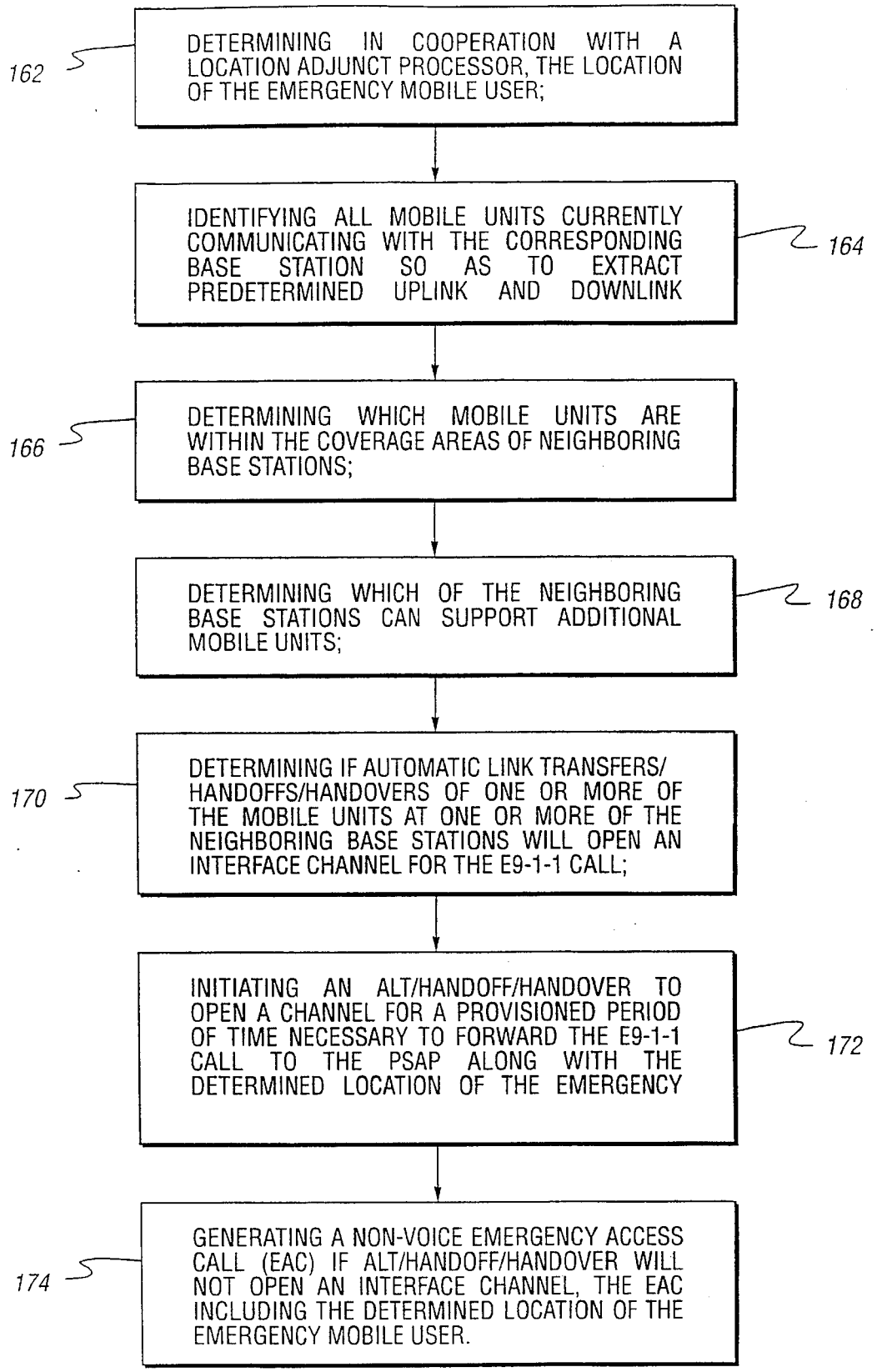
FIG. 23 is a block diagram of the method steps of the present invention.

With reference to FIG. 23 of the drawings, the more detailed method steps of the present invention may be described. As indicated above, the method is specifically directed for use in a wireless communication system including a plurality of base stations each operative to communicate with corresponding mobile units within its coverage area over air interface channels.

The method is operative to route E9-1-1 calls from an originating mobile unit to a Public Safety Answering Point in situations where all interface channels of the corresponding base stations are busy. The method includes determining 162 in cooperation with the Location Adjunct Processor (LAP), the location of the emergency mobile user. By identifying 164, all mobile units currently communicating with the corresponding base stations, predetermined uplink and downlink RF measurements may be extracted for each unit so as to further determine 166 which mobile units are also within the coverage areas of neighboring base stations.

Thereafter, it may be determined 168 which of the neighboring base stations can support additional mobile units. It may further be determined 170 if Automatic Link Transfers (ALTs)/handoffs/handovers of one or more of the mobile units at one or more of the neighboring base stations will open an interface channel for the E9-1-1 call. If so, ALTs/handoffs/handovers will be initiated 172 and the mobile user will be allowed to have the opened channel for a provisioned period of time necessary to forward the E9-1-1 call to the PSAP 132 along with the determined location of the emergency mobile user. If ALTs/handoffs/handovers will not open an interface channel, a non-voice Emergency Access Call (EAC) will be generated 174 for receipt by the PSAP which includes the determined location of the emergency mobile user.

While the best modes for carrying out the invention have been described in detail, those familiar with the art to which this invention relates will recognize various alternative designs and embodiments for practicing the invention as defined by the following claims.

What is claimed is:

1. For use in a wireless communication system including a plurality of base stations each operative to communicate with corresponding mobile units within its coverage area over air interface channels, the method of routing an E9-1-1 call from a mobile emergency user to a public safety answering point (PSAP) where all interface channels of the corresponding base station are busy, the method comprising:

for each of the base stations, determining in cooperation with a receiver, a plurality of RF measurements for the base station, including its link budget, for a predetermined plurality of arc segment regions;

for each of the base stations, modeling its determined RF measurements as a scaled contour shape having minimum and maximum boundaries which is capable of being projected on a graphical information system (GIS) ;

determining RF measurements from neighboring base stations;

determining where the corresponding contours of the RF measurements from neighboring base stations intersect so as to define a bounding polygon area that describes the location of the mobile emergency user in terms of a minimum and maximum error estimate;

identifying all mobile units currently communicating with the corresponding base station of the mobile emergency user and extracting predetermined uplink and downlink RF measurements for each unit;

by reference to the uplink and downlink RF measurements, determining which mobile units are also within the coverage areas of neighboring base stations;

determining which of the neighboring base stations can support additional mobile units;

determining if Automatic Link Transfers (ALTs)/handoffs/handovers of one or more of the identified mobile units at one or more of the neighboring base stations will open an interface channel for the E9-1-1 call;

if one or more ALTs/handoffs/handovers will not open an interface channel, generating a non-voice Emergency Alarm Call (EAC) for receipt by the PSAP, the EAC including the determined location of the mobile emergency user;

if one or more ALTs/handoffs will open an interface channel, initiating the ALTs/handoffs/handover and allowing the mobile emergency user to have the opened channel for a provisioned period of time necessary to forward the E9-1-1 call to the PSAP along with its determined location.

2. The method of claim 1, further comprising determining the location of the corresponding base station in cooperation with an Automatic Location Identification/Data Management System (ALI/DM) database and forwarding the location of the corresponding base station to the PSAP along with the E9-1-1 call.

3. The method of claim 1, wherein the EAC includes an ID number uniquely associated with the originating mobile unit.

* * * * *